(12) United States Patent
Lee et al.

(10) Patent No.: US 8,842,609 B2
(45) Date of Patent: Sep. 23, 2014

(54) METHOD AND APPARATUS FOR TRANSMITTING ACK/NACK INFORMATION IN MULTICARRIER-SUPPORTING WIRELESS COMMUNICATION SYSTEM

(75) Inventors: Hyunwoo Lee, Anyang-si (KR); Jaehoon Chung, Anyang-si (KR); Seunghee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 396 days.

(21) Appl. No.: 13/279,207

(22) Filed: Oct. 21, 2011

(65) Prior Publication Data

US 2012/0099491 A1 Apr. 26, 2012

Related U.S. Application Data

(60) Provisional application No. 61/411,456, filed on Nov. 8, 2010, provisional application No. 61/405,622, filed on Oct. 21, 2010, provisional application No. 61/409,089, filed on Nov. 1, 2010.

(51) Int. Cl.

| | |
|---|---|
| H04L 1/16 | (2006.01) |
| H04L 1/00 | (2006.01) |
| H04L 5/00 | (2006.01) |
| H04W 28/06 | (2009.01) |
| H04W 28/04 | (2009.01) |
| H04W 72/00 | (2009.01) |
| H04W 84/04 | (2009.01) |

(52) U.S. Cl.
CPC .............. *H04L 1/1607* (2013.01); *H04L 1/003* (2013.01); *H04W 28/04* (2013.01); *H04W 72/00* (2013.01); *H04L 1/0029* (2013.01); *H04L 5/0055* (2013.01); *H04L 1/0015* (2013.01); *H04W 84/047* (2013.01); *H04L 5/0007* (2013.01); *H04L 5/0053* (2013.01); *H04W 28/065* (2013.01)
USPC .......................................... 370/328; 370/280

(58) Field of Classification Search
USPC .......................................................... 370/328
See application file for complete search history.

(56) References Cited

U.S. PATENT DOCUMENTS

| | | | |
|---|---|---|---|
| 8,320,431 B2 * | 11/2012 | Maheshwari et al. ........ | 375/211 |
| 2010/0150081 A1 * | 6/2010 | Gao et al. ...................... | 370/329 |
| 2010/0272048 A1 * | 10/2010 | Pan et al. ...................... | 370/329 |
| 2011/0002276 A1 * | 1/2011 | Chen et al. .................... | 370/329 |
| 2011/0103510 A1 * | 5/2011 | Gaal et al. ..................... | 375/295 |
| 2011/0243066 A1 * | 10/2011 | Nayeb Nazar et al. ....... | 370/328 |
| 2011/0249656 A1 * | 10/2011 | Cai et al. ....................... | 370/336 |
| 2011/0255484 A1 * | 10/2011 | Zhang et al. .................. | 370/329 |
| 2011/0317605 A1 * | 12/2011 | Fan et al. ...................... | 370/311 |
| 2012/0106569 A1 * | 5/2012 | Che et al. ...................... | 370/437 |
| 2012/0113831 A1 * | 5/2012 | Pelletier et al. ............... | 370/252 |

* cited by examiner

*Primary Examiner* — Wei Zhao
*Assistant Examiner* — Robert M Morlan
(74) *Attorney, Agent, or Firm* — Lee, Hong, Degerman, Kang & Waimey

(57) ABSTRACT

A method and apparatus for transmitting ACK/NACK information in a multicarrier-supporting wireless communication system are disclosed. A method for allowing a user equipment to transmit ACK/NACK information in a multicarrier-supporting wireless communication system includes generating individual ACK/NACK information in association with individual codewords received from a base station through N carriers (where N≥2) for use in M downlink subframes (where M≥2), performing, if the sum of numbers of bits of the individual ACK/NACK information exceeds a predetermined payload size and M is not set to 9, spatial bundling to individual ACK/NACK information of (M+C−9) carriers ranging over the M downlink subframes, and transmitting the spatially-bundled ACK/NACK information and the remaining individual ACK/NACK information to the base station through one uplink subframe. C is a total sum of maximum numbers of codewords configured in each of the N carriers for use in one downlink subframe.

12 Claims, 15 Drawing Sheets

FIG. 5
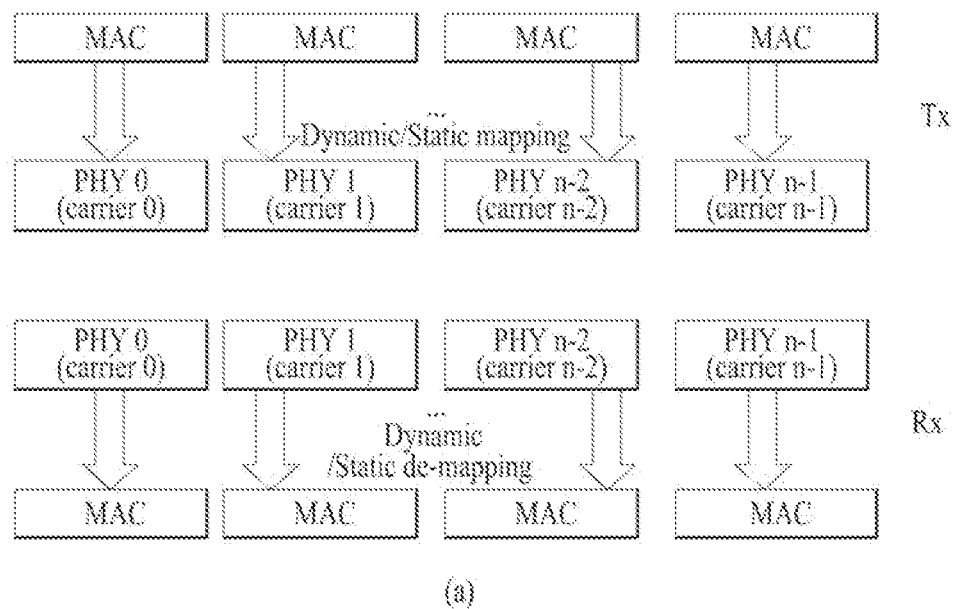
(a)
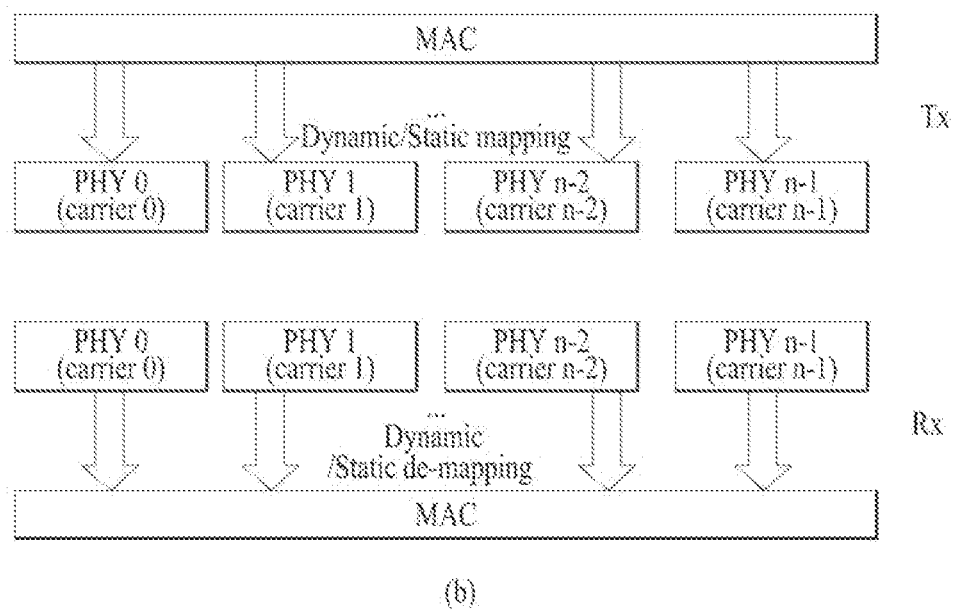
(b)

FIG. 9
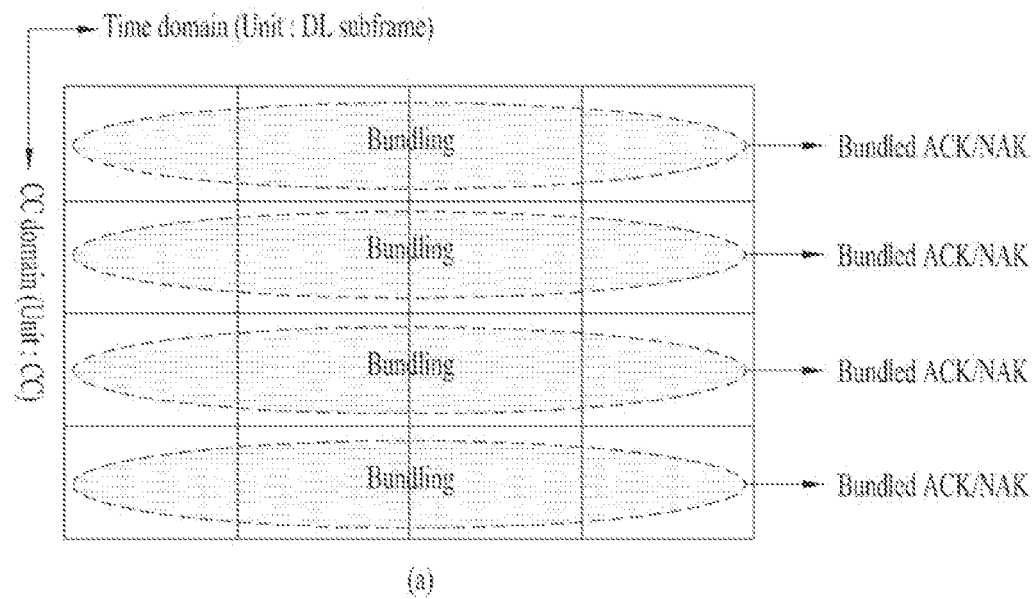
(a)
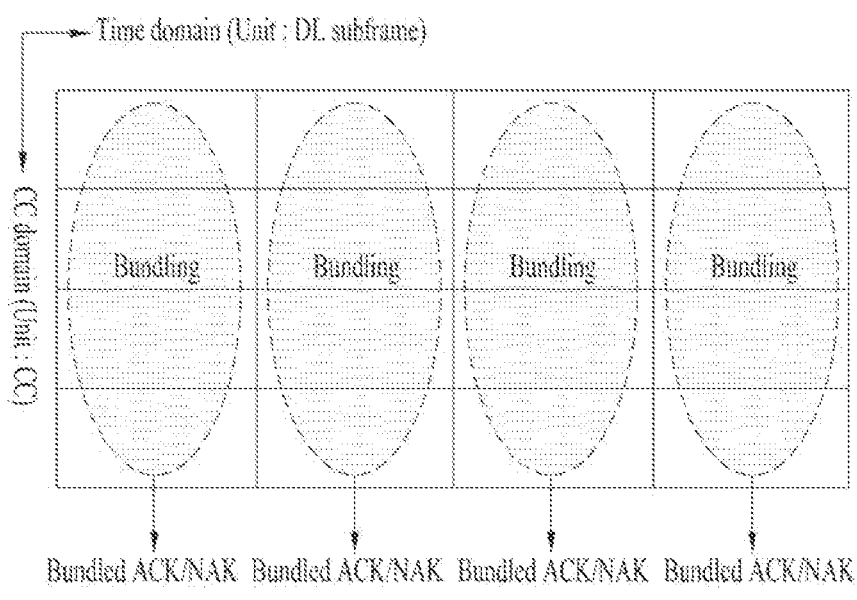
(b)

METHOD AND APPARATUS FOR TRANSMITTING ACK/NACK INFORMATION IN MULTICARRIER-SUPPORTING WIRELESS COMMUNICATION SYSTEM

CROSS-REFERENCE TO RELATED APPLICATIONS

Pursuant to 35 U.S.C. §119(e), this application claims the benefit of U.S. Provisional Patent Application Ser. Nos. 61/411,456, filed on Nov. 8, 2010, 61/405,622, filed on Oct. 21, 2010, and 61/409,089, filed on Nov. 1, 2010, the contents of which are all hereby incorporated by reference herein in their entirety.

BACKGROUND OF THE INVENTION

1. Field of the Invention

The present invention relates to a wireless communication system, and more particularly to a method and apparatus for transmitting ACK/NACK information in a multicarrier-supporting wireless communication system.

2. Discussion of the Related Art

Although downlink and uplink bandwidths are different from each other, a wireless communication system typically uses one carrier. For example, a wireless communication system having one carrier for each of the downlink and the uplink and symmetry between the downlink and uplink bandwidths may be provided based on a single carrier. The evolved or developed wireless communication system has to support wider bandwidths, compared to legacy wireless communication systems. Accordingly, a technology for efficiently using small segmented bands, known as carrier aggregation (CA) technology, has been developed in order to aggregate a plurality of physical bands to a wider logical band. Carrier aggregation may be applied to each of uplink and downlink.

In the meantime, Hybrid Automatic Repeat reQuest (HARQ) ACK/NACK information indicating whether data transmitted from a transmitter has been successfully decoded may be transmitted from a receiver to the transmitter. For example, a cyclic redundancy check (CRC) may be added to data transmitted from the transmitter on a codeword basis, such that the receiver may generate ACK/NACK information on a codeword basis. For example, information indicating the success or failure of decoding of one codeword may be represented by ACK/NACK information of 1 bit.

SUMMARY OF THE INVENTION

Accordingly, the present invention is directed to a method and apparatus for transmitting ACK/NACK information in a multicarrier-supporting wireless communication system that substantially obviates one or more problems due to limitations and disadvantages of the related art.

In the case where only transmission of 2 codewords is supported on a single carrier as in the legacy wireless communication system, it is possible to support the HARQ operation using only ACK/NACK information composed of a maximum of 2 bits. However, there is a need for the system supporting carrier aggregation to transmit ACK/NACK information of numerous codewords. For example, provided that a channel structure capable of supporting ACK/NACK information composed of a maximum of X bits is defined, it may be necessary to transmit ACK/NACK information of more than X bits due to carrier aggregation or the like.

An object of the present invention is to provide a method and apparatus for generating and transmitting an aggregate or bundling of ACK/NACK information on the condition that a system capable of supporting carrier aggregation needs to transmit ACK/NACK information larger than the predefined payload.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for allowing a user equipment to transmit ACK/NACK information in a multicarrier-supporting wireless communication system includes generating individual ACK/NACK information in association with individual codewords received from a base station through N carriers (where N≥2) for use in M downlink subframes (where M≥2); performing, if the sum of numbers of bits of the individual ACK/NACK information exceeds a predetermined payload size and M is not set to 9, spatial bundling to individual ACK/NACK information of (M+C−9) carriers ranging over the M downlink subframes; and transmitting the spatially-bundled ACK/NACK information and the remaining individual ACK/NACK information to the base station through one uplink subframe, wherein C is a total sum of maximum numbers of codewords configured in each of the N carriers for use in one downlink subframe.

In another aspect of the present invention, a user equipment for transmitting ACK/NACK information in a multicarrier-supporting wireless communication system includes a reception module for receiving a downlink signal from a base station; a transmission module for transmitting an uplink signal to the base station; and a processor connected to the reception module and the transmission module so as to control operations of the user equipment. The processor, through the reception module, generates individual ACK/NACK information in association with individual codewords received from the base station through N carriers (where N≥2) for use in M downlink subframes (where M≥2), performs spatial bundling to individual ACK/NACK information of (M+C−9) carriers ranging over the M downlink subframes when the sum of numbers of bits of the individual ACK/NACK information exceeds a predetermined payload size and M is not set to 9, and transmits the spatially-bundled ACK/NACK information and the remaining individual ACK/NACK information to the base station through one uplink subframe. C is a total sum of maximum numbers of codewords configured in each of the N carriers for use in one downlink subframe.

The following characteristics can be commonly applied to the above-mentioned embodiments of the present invention.

The spatial bundling may be applied over individual ACK/NACK information of several codewords for use in one downlink subframe and one carrier.

The (M+C−9) carriers may be sequentially selected from a last logical indexed carrier from among a plurality of carriers, each of which transmits 2 codewords, from among the N carriers.

If the M is set to 9 and the N is set to 9, the spatial bundling may be performed to the N carriers ranging over the M downlink subframes.

A total sum of numbers of bits of the spatially-bundled ACK/NACK information and numbers of bits of the remaining individual ACK/NACK information may be identical to or less than the predetermined payload size.

The wireless communication system may be a time division duplex (TDD) system.

M is set to 2, 3, 4 or 9, N is set to 2, 3, 4 or 5, one or two codewords are transmitted in each of the N carriers, and the predetermined payload size is 20 bits.

It is to be understood that both the foregoing general description and the following detailed description of the present invention are exemplary and explanatory and are intended to provide further explanation of the invention as claimed.

As apparent from the above description, exemplary embodiments of the present invention have the following effects. The embodiments of the present invention provide a method and apparatus for generating and transmitting an aggregate or bundling of ACK/NACK information on the condition that a system capable of supporting carrier aggregation needs to transmit ACK/NACK information larger than the predefined payload.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 5 shows a physical layer (L1) and a MAC layer (L2) of a multicarrier-supporting system;

FIG. 9 shows exemplary ACK/NACK bundling applicable to either one of a time domain and a CC domain;

DETAILED DESCRIPTION OF THE INVENTION

Figure 1:
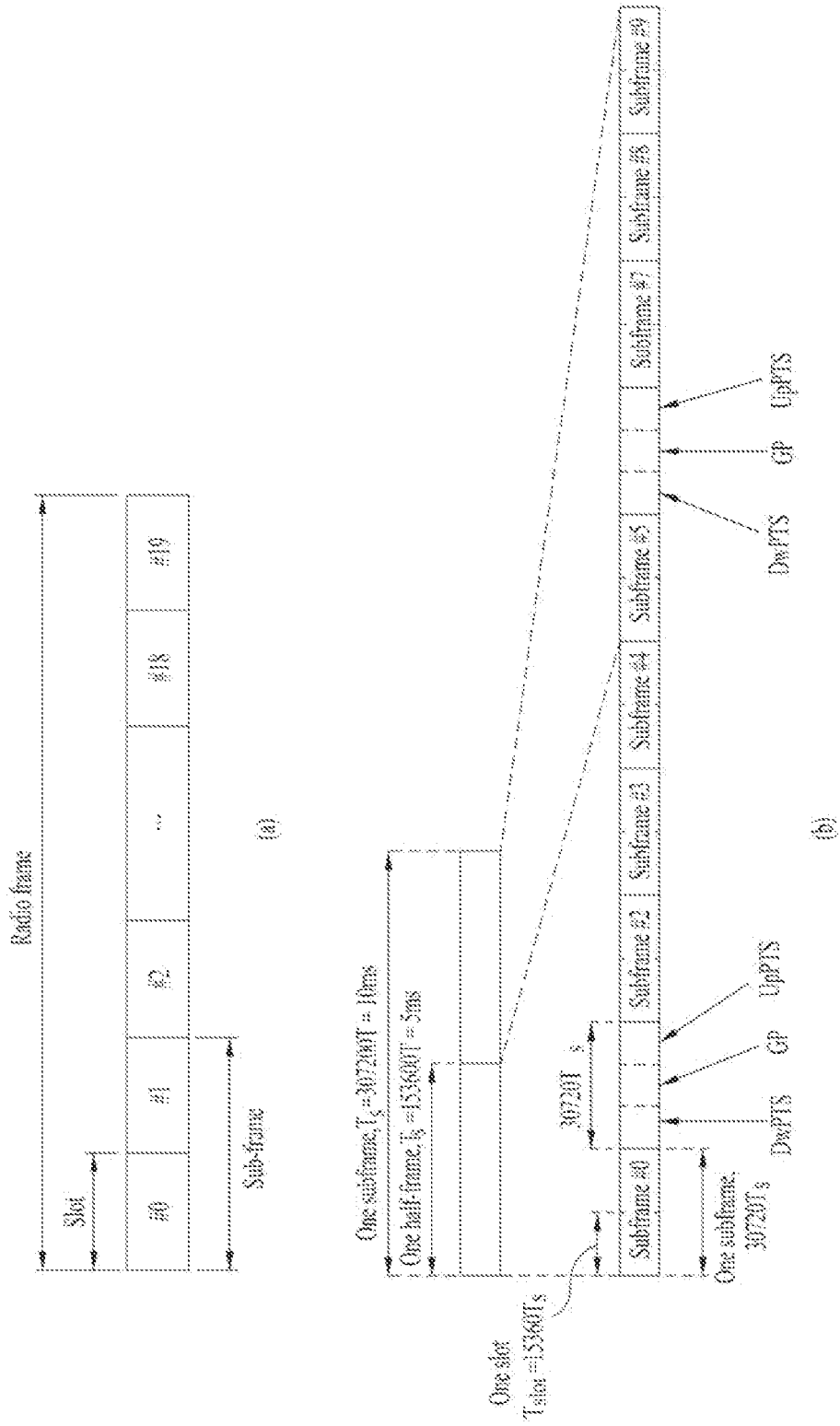
FIG. 1 exemplarily shows a radio frame structure for use in a 3rd Generation Partnership Project Long Term Evolution (3GPP LTE) system.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with User Equipment (UE), Mobile Station (MS), Mobile Subscriber Station (MSS) or Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

FIG. 1 exemplarily shows a radio frame structure for use in a 3rd Generation Partnership Project Long Term Evolution (3GPP LTE) system. A downlink (DL) radio frame structure will hereinafter be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplexing (FDD) and a type 2 radio frame structure applicable to Time Division Duplexing (TDD).

FIG. 1(a) is a diagram showing the structure of the type 1 radio frame. A downlink radio frame includes 10 subframes, and one subframe includes two slots in a time region. A time required for transmitting one subframe is defined in a Transmission Time Interval (TTI). For example, one subframe may have a length of 1 ms and one slot may have a length of 0.5 ms. One slot may include a plurality of OFDM symbols in a time region and include a plurality of Resource Blocks (RBs) in a frequency region. Since the 3GPP LTE system uses OFDMA in downlink, the OFDM symbol indicates one symbol duration. The OFDM symbol may be called an SC-FDMA symbol or a symbol duration. RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If the channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
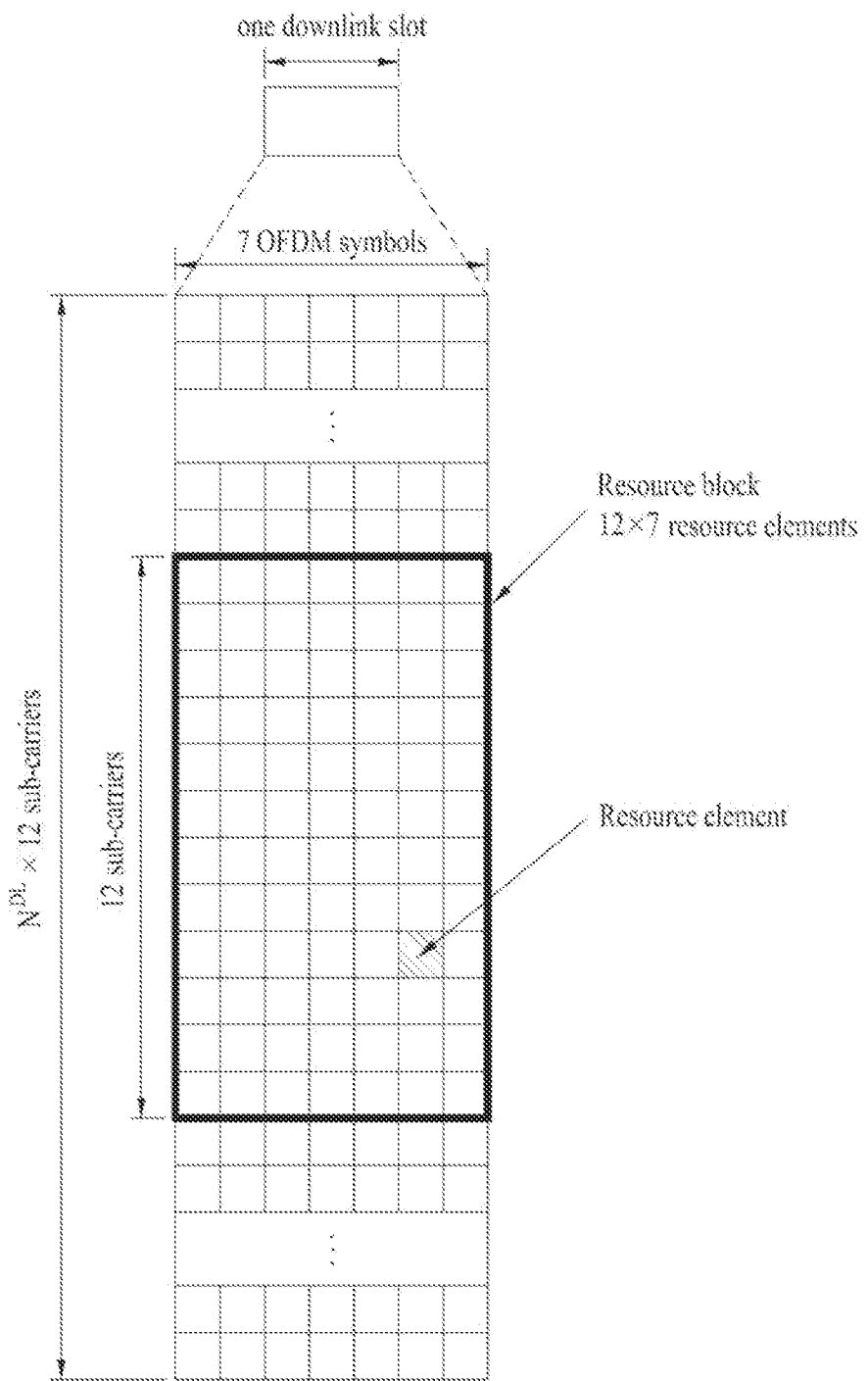
FIG. 2 exemplarily shows a resource grid of a downlink (DL) slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
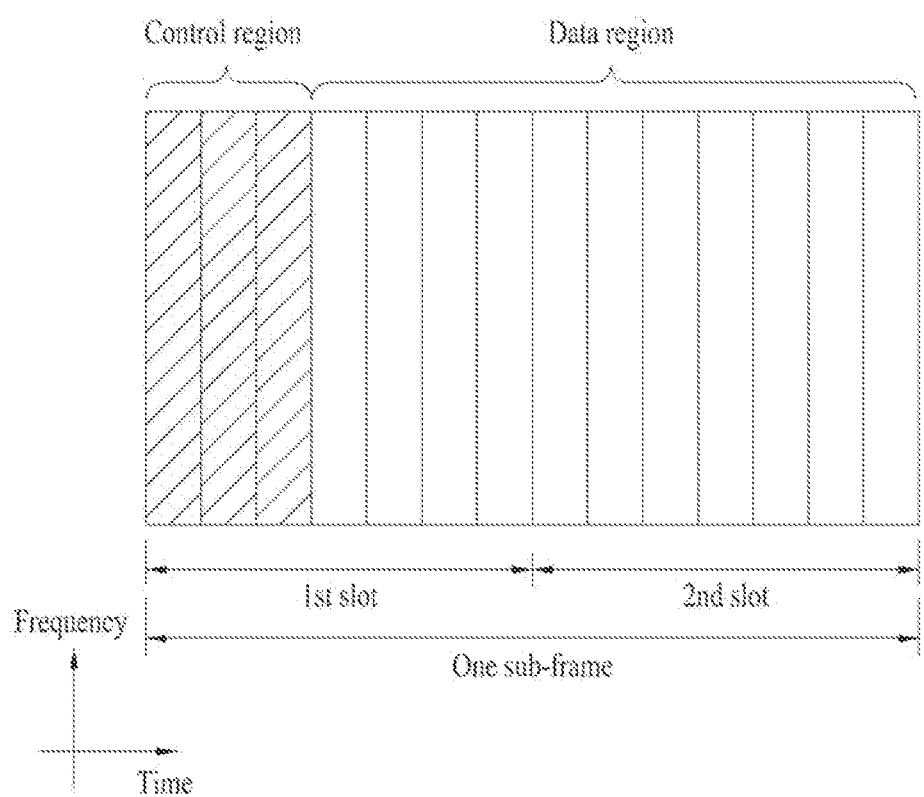
FIG. 3 is a downlink (DL) subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmission power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
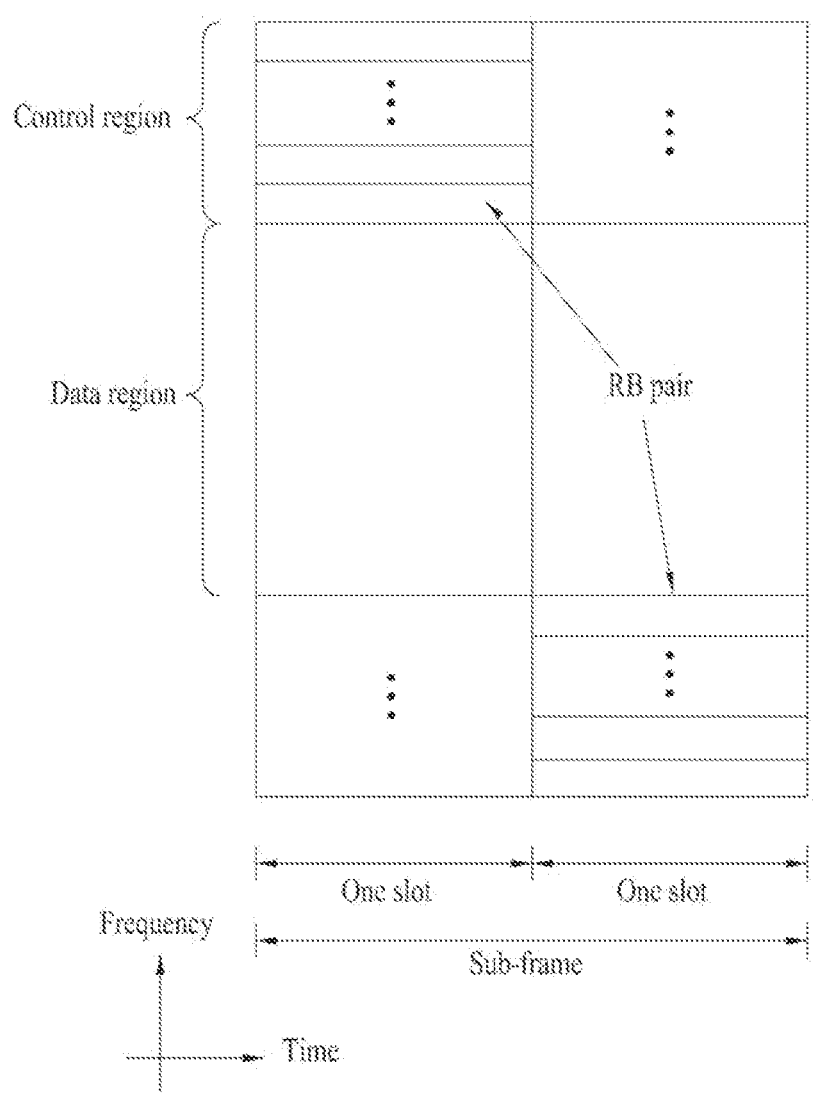
FIG. 4 is an uplink (UL) subframe structure.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Carrier Aggregation

A carrier aggregation (CA) technology will hereinafter be described in detail. The carrier aggregation (CA) technology for the evolved OFDM mobile communication system, in a carrier (denoted by a component carrier (CC) or a carrier band) individually designated for downlink and uplink, allows a downlink transmission entity to simultaneously transmit data or control information in downlink through one or more carriers or allows an uplink transmission entity to transmit data or control information in downlink through one or more carriers. The bandwidth of aggregated carrier may be designed to support a variety of carrier bandwidths (e.g., 1.4 MHz, 3 MHz, 5 MHz, 10 MHz, 15 MHz, and 20 MHz bandwidths) so as to achieve backward compatibility with the legacy system. Alternatively, a new bandwidth is defined irrespective of a carrier bandwidth used in the legacy system, so as to support carrier aggregation (CA). In addition, aggregated carriers may be contiguous carriers or non-contiguous carriers. The carrier aggregation (CA) may also be called a multiple carrier, a bandwidth aggregation or a spectrum aggregation.

FIG. 5 shows a physical layer (first layer, L1) and a MAC layer (second layer, L2) of a multicarrier-supporting system. FIG. 5 shows a physical layer (first layer, L1) and a MAC layer (second layer, L2) of a multicarrier-supporting system. Referring to FIG. 5, an eNB or BS of the legacy wireless communication system supporting a single carrier includes one physical layer (PHY) entity capable of supporting one carrier, and one medium access control (MAC) entity for controlling one PHY entity may be provided to the eNB. For example, baseband processing may be carried out in the PHY layer. For example, the L1/L2 scheduler operation including not only MAC PDU (Protocol Data Unit) creation of a transmitter but also MAC/RLC sub-layers may be carried out in the MAC layer. The MAC PDU packet block of the MAC layer is converted into a transport block through a logical transport layer, such that the resultant transport block is mapped to a physical layer input information block. In FIG. 5, the MAC layer is represented as the entire L2 layer, and may conceptually cover MAC/RLC/PDCP sub-layers. For convenience of description and better understanding of the present invention, the above-mentioned application may be used interchangeably in the MAC layer description of the present invention.

On the other hand, a multicarrier-supporting system may provide a plurality of MAC-PHY entities. In more detail, as can be seen from FIG. 5(a), the transmitter and receiver of the multicarrier-supporting system may be configured in such a manner that one MAC-PHY entity is mapped to each of n component carriers (n CCs). An independent PHY layer and an independent MAC layer are assigned to each CC, such that a PDSCH for each CC may be created in the range from the MAC PDU to the PHY layer.

Alternatively, the multicarrier-supporting system may provide one common MAC entity and a plurality of PHY entities. That is, as shown in FIG. 5(b), the multicarrier-supporting system may include the transmitter and the receiver in such a manner that n PHY entities respectively correspond to n CCs and one common MAC entity controlling the n PHY entities may be present in each of the transmitter and the receiver. In this case, a MAC PDU from one MAC layer may be branched into a plurality of transport blocks corresponding to a plurality of CCs through a transport layer. Alternatively, when generating a MAC PDU in the MAC layer or when generating an RLC PDU in the RLC layer, the MAC PDU or RLC PDU may be branched into individual CCs. As a result, a PDSCH for each CC may be generated in the PHY layer.

In carrier aggregation (CA), a DL resource may be defined as downlink component carrier (DL CC), and an UL resource may be defined as uplink component carrier (UL CC). In addition, a combination of DL resource and UL resource may be called a cell. However, if DL CC and UL CC are asymmetrically configured, the cell may refer only to DL CC (or UL CC). For example, if one configured serving cell is configured in a specific UE, one DL CC and one UL CC are assigned to the UE. However, if two or more serving cells are configured in a specific UE, the UE has as many DL CCs as the number of cells, and the number of UL CCs may be identical to or less than the number of DL CCs. Alternatively, if several serving cells are configured in a specific UE, the CA environment including many more UL CCs than DL CCs may be supported in the UE.

Linkage between a carrier frequency (i.e., the center frequency of a cell) of DL resources and a carrier frequency of UL resources may be indicated by system information (SI) transmitted on DL resources. For example, the combination of DL resource and UL resource may be configured by linkage defined by System Information Bock Type-2 (SIB2).

According to the above-mentioned definition, the carrier aggregation (CA) may also be called a combination of two or more cells having different carrier frequencies. That is, a specific case in which two or more serving cells having different carrier frequencies are configured in a specific UE may be denoted by a CA environment. For UEs supporting the CA, one or more secondary cells (SCells) and one or more primary cells (PCells) are aggregated and used, such that the increased bandwidth can be supported.

In this case, the serving cell may be a PCell or SCell. If an RRC-CONNECTED UE does not support the CA, there is only one SCells including PCell. In addition, the RRC_CONNECTED UE supports the CA, the term "SCell" may refer to a set or aggregate of one or more cells including PCell and SCell.

PCell is used as the center cell of control-associated communication from among serving cells configured in the CA environment. A cell commanded or used by a UE performing an initial connection establishment procedure, a connection re-establishment procedure or a handover (HO) procedure may be used as a PCell. The UE may be assigned a physical uplink control channel (PUCCH) only in its own Pcell, and transmit the PUCCH only in the PCell. In addition, the UE may perform the monitoring procedure for acquiring and changing system information (SI) only in the PCell. In association with a UE supporting the CA, a base station (BS) may change a PCell only through a handover procedure that uses an 'RRCConnectionReconfiguration' message including a 'mobilityControlInfo' message.

Next, SCell means the remaining cells other than a PCell from among serving cells configured in the CA environment. SCell does not include a PUCCH. In case of adding SCell, a base station may provide a UE supporting the CA with all system information (SI) pieces related to the operation of the corresponding cell having an RRC_CONNECTED status. In relation to SCell, the change of system information (SI) may be carried out by release or addition of the corresponding SCell through one 'RRCConnectionReconfiguration' message. The base station may transmit dedicated signaling having parameters different from those of a broadcast message in the corresponding SCell to a UE. After performing the initial security activation procedure, the base station may establish not only PCell (acting as a serving cell during a connection establishment procedure) but also one or more SCells in the UE. PCell may be used to provide security input and higher layer system information. SCell may be used to provide additional DL resources, and may also be used to provide UL resources as necessary. The base station may independently add, remove, or correct the SCell through the RRC connection reconfiguration procedure using the 'RRCConnection-Reconfiguration' message that includes or does not include the 'mobilityControlInfo' message.

In summary, multicarriers for use in carrier aggregation (CA) are classified into PCell and SCell, and may be used as UE-specific parameters. A specific UE may have one or more configured serving cells. If several configured serving cells are present, one cell may be set to PCell, and the remaining cells other than the Pcell may be set to SCells. In this case, PCell may be set to a cell having the lowest index from among cell indexes (e.g., ServCellIndex). In addition, if a UE for use in a TDD scheme includes a plurality of configured serving cells, UL-DL configuration, that defines which DL subframe is used to transmit ACK/NACK information of a PDSCH transmitted from a specific DL subframe, may be identical in all cells.

In addition, a UE may transmit not only channel state information (e.g., CSI, RI, PMI, etc.) measured in one or more CCs but also UL control information such as HARQ ACK/NACK to the base station within one CC. For example, the UE collects several ACK/NACK information (e.g., ACK/NACK multiplexing or ACK/NACK bundling) received from PCell DL CC and SCell(s) DL CC, such that it can transmit the collected information using one PUCCH in a UL CC of the PCell.

Decision of ACK/NACK Transmission Resources

ACK/NACK information is control information that is fed back from a receiver to a transmitter according to the success or failure of decoding of data transmitted from the transmitter. For example, if a UE has successfully decoded DL data, the UE may feed back ACK information to the base station. Otherwise, the UE may feed back NACK information to the base station. In more detail, the case in which a receiver for use in the LTE system has to transmit ACK/NACK information may be classified into the following three cases.

In the first case, ACK/NACK information is transmitted in response to PDSCH transmission indicated by PDCCH detection. In the second case, ACK/NACK information is transmitted in response to a PDCCH indicating semi-persistent scheduling (SPS) release. In the third case, ACK/NACK information is transmitted in response to a PDSCH that is transmitted without PDCCH detection. In more detail, the third case indicates ACK/NACK transmission in response to SPS. In so far as there is no additional remark in the following description, the ACK/NACK transmission method is not limited to any one of the above-mentioned three cases.

Next, transmission resources of ACK/NACK information for use in an FDD or TDD scheme will hereinafter be described in detail.

The FDD scheme is designed to perform data transmission/reception in different ways according to DL and UL for each independent frequency band. Therefore, if a base station transmits a PDSCH through a DL band, the UE may transmit an ACK/NACK response indicating whether the UE has correctly received DL data through a PUCCH of a UL band corresponding to a DL band after the lapse of a specific time. Therefore, DL and UL are mapped to each other on a one to one basis.

In more detail, according to the example of the legacy 3GPP LTE system, control information of DL data transmission of the base station is transmitted to a UE through a PDCCH. After the UE receives PDCCH-scheduled data through a PDSCH, it can transmit ACK/NACK information through a PUCCH (or using a piggyback scheme on a PUSCH) via which the UE transmits UL control information. Generally, a PUCCH for ACK/NACK transmission is not pre-assigned to each UE, and several UEs contained in a cell are designed to divisionally use several PUCCHs at every time. Therefore, as an example of a PUCCH via which the UE having received DL data at an arbitrary time transmits ACK/NACK information, a PUCCH corresponding to a PDCCH via which the UE can receive scheduling data for the corresponding DL data may be used.

The PUCCH corresponding to the PDCCH will hereinafter be described in detail. A transmission region of a PDCCH of each DL subframe includes a plurality of control channel elements (CCEs), and a PDCCH transmitted from an arbitrary subframe to one UE includes one or more CCEs from among CCEs contained in a PDCCH region of the arbitrary subframe. In addition, a transmission region of a PUCCH for each UL subframe includes a plurality of resources capable of transmitting a plurality of PUCCHs. In this case, the UE may transmit ACK/NACK information through a PUCCH corresponding to an index mapped to an index of a specific CCE (i.e., a first CCE) from among CCEs contained in the PDCCH received in the UE.

Figure 6:
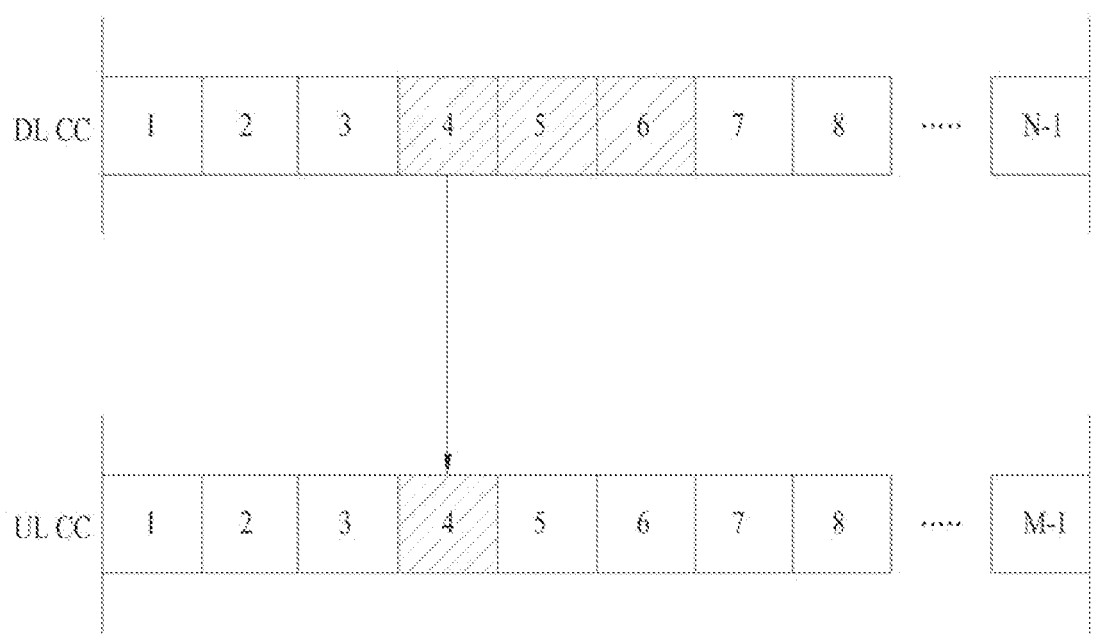
FIG. 6 shows resources for ACK/NACK transmission of a PDSCH.

FIG. 6 shows resources for ACK/NACK transmission of a PDSCH. In FIG. 6, each square contained in a DL CC may indicate a CCE, and each square contained in a UL CC may indicate a PUCCH. In FIG. 6, it may be assumed that one UE receives PDSCH-related information through a PDCCH composed of Nos. 4, 5, 6 CCEs and at the same time receives a PDSCH. In this case, ACK/NACK information of a PDSCH can be transmitted through a PUCCH corresponding to No. 4 CCE (i.e., No. 4 PUCCH) indicating a first CCE constructing a PDCCH scheduling a PDSCH. FIG. 6 exemplarily shows the case in which a maximum of M PUCCHs are present in a UL CC on the condition that a maximum of N CCEs are present in a DL CC. Although N may be identical to M (i.e., N=M), M and N may also be set to different values as necessary, and the mapping of CCEs and PUCCHs may be overlapped.

In the FDD system, the UE may transmit ACK/NACK information at a subframe index (n) upon receiving PDSCH transmission data at a subframe index (n−k) (for example, k=4 in the LTE system). Upon receiving a PDCCH indicating PDSCH transmission at the subframe (n−k), the UE may determine a PUCCH resource index for HARQ ACK/NACK transmission at the subframe (n).

For example, the PUCCH resource index for use in the LTE system can be represented by the following equation 1.

$$n^{(1)}_{PUCCH} = n_{CCE} + N^{(1)}_{PUCCH} \quad \text{[Equation 1]}$$

In Equation 1, $n^{(1)}_{PUCCH}$ is a resource index of PUCCH format 1 for ACK/NACK transmission, $N^{(1)}_{PUCCH}$ is a signaling value received from a higher layer, and $n_{CCE}$ is the lowest value from among CCE indexes used for PDCCH transmission. A cyclic shift for PUCCH format 1a/1b, an orthogonal spread code, and a physical resource block (PRB) can be obtained from $n^{(1)}_{PUCCH}$.

ACK/NACK transmission for use in the TDD scheme will hereinafter be described in detail.

In the TDD mode, DL transmission and UL transmission are distinguished from each other in time, such that subframes contained in one radio frame are classified into a DL subframe and a UL subframe. Table 1 shows an example of UL-DL structure for use in the TDD mode.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, D is a DL subframe, U is an UL subframe, and S is a special subframe. Specifically, a subframe includes three fields, i.e., a Downlink Pilot TimeSlot (DwPTS) field, a Guard Period (GP) field, and an Uplink Pilot TimeSlot (UpPTS) field. DwPTS is a time interval reserved for DL transmission, and UpPTS is a time interval reserved for UL transmission.

In the TDD system, a UE may transmit ACK/NACK information for PDSCH transmission of one or more DL subframes within one UL subframe. In response to PDSCH transmission data received at the DL subframe (n−k), the UE may transmit HARQ ACK/NACK information at the UL subframe (n), where k may be given according to the above-mentioned UL-DL configurations. For example, in association with the UL-DL configurations of Table 1, DL-related set indexes [K: $\{k_0, k_1, \ldots k_{M-1}\}$] may be given as shown in the following Table 2.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in case of the UL-DL configuration (0) in Table 2, k=4 is given at the UL subframe (9), such that ACK/NACK information for data received at the DL subframe (5) (=9−4) may be transmitted at the UL subframe (9). A method for determining a PUCCH resource index during ACK/NACK transmission of a TDD system will hereinafter be described in detail.

First, the number of elements ($\{k_0, k_1, \ldots k_{M-1}\}$) of the set (K) shown in Table 2 is defined as M. For example, in case of the UL-DL configuration (0), the number of elements of the set K of the subframe (2) in case of the UL-DL configuration (0) is set to 1, and the number of elements of the set K of the subframe (2) in case of the UL-DL configuration (2) is set to 4.

For TDD ACK/NACK bundling or TDD ACK/NACK multiplexing at the subframe (n) having M=1, the UE may determine PUCCH resources $n_{PUCCH}^{(1)}$ for HARQ ACK/NACK transmission at the subframe (n) using the following method.

If PDSCH transmission indicated by a PDCCH or a PDCCH indicating SPS release is present in the subframe (n−k) (where k∈K), the UE selects a value (p) from among {0, 1, 2, 3} so as to satisfy $N_p \le n_{CCE} < N_{p+1}$. PUCCH resource index $n_{PUCCH}^{(1)}$ can be determined by the following equation 2.

$$n_{PUCCH}^{(1)} = (M-m-1) \times N_p + m \times N_{p+1} + n_{CCE} + N_{PUCCH}^{(1)} \quad \text{[Equation 2]}$$

In Equation 2, $n^{(1)}_{PUCCH}$ is a resource index of PUCCH format 1, and $N^{(1)}_{PUCCH}$ is a signaling value received from a higher layer. $n_{CCE}$ is the lowest value from among CCE indexes used for PDCCH transmission at the subframe (n−$k_m$) (where $k_m$ is the lowest value from among the set K). $N_p$ can be determined by the following equation 3.

$$N_p = \max\{0, \lfloor [N_{RB}^{DL} \times (N_{sc}^{RB} \times p - 4)]/36 \rfloor\}, \quad \text{[Equation 3]}$$

In Equation 3, $N_{RB}^{DL}$ indicates a DL bandwidth configuration, and is represented in units of $N_{sc}^{RB}$. $N_{sc}^{RB}$ is the size of a resource block for use in a frequency domain, and is represented by the number of subcarriers.

If PDSCH transmission data without a PDCCH is present in the subframe (n−k) [where (k∈K)], $n_{PUCCH}^{(1)}$ can be determined by a higher layer configuration.

On the other hand, for TDD ACK/NACK multiplexing at the subframe (n) of M>1, the UE may determine PUCCH resources for HARQ ACK/NACK transmission as shown in the following description. Hereinafter, $n_{PUCCH,i}^{(1)}$ (0≤i≤M−1) is referred to as ACK/NACK resources derived from the subframe (n−$k_i$), and HARQ-ACK(i) is referred to as an ACK/NACK response derived from the subframe (n−$k_i$).

If PDSCH transmission indicated by a PDCCH or a PDCCH indicating SPS release is present in the subframe (n−$k_i$) [where ($k_i \in K$)], ACK/NACK resource $n_{PUCCH,i}^{(1)}$ can be determined by the following equation 4.

$$n_{PUCCH,i}^{(1)} = (M-i-1) \times N_p + i \times N_{p+1} + n_{CCE,i} + N_{PUCCH}^{(1)} \quad \text{[Equation 4]}$$

In Equation 4, $N_{PUCCH}^{(1)}$ is a signaling value received from a higher layer. $n_{CCE,i}$ is the lowest value from among CCE indexes used for PDCCH transmission at the subframe (n−$k_i$). A value (p) is selected from among {0, 1, 2, 3} so as to satisfy $N_p \leq n_{CCE,i} < N_{p+1}$. $N_p$ can be determined by Equation 3.

If PDSCH transmission without a PDCCH is present in the subframe (n−$k_i$) [where ($k_i \in K$)], $n_{PUCCH,i}^{(1)}$ can be determined by a higher layer configuration.

The UE can transmit bits b(0),b(1) on ACK/NACK resource $n_{PUCCH}^{(1)}$ at the subframe (n) using the PUCCH format 1b. The values of b(0),b(1) and the ACK/NACK resource $n_{PUCCH}^{(1)}$ can be generated by channel selection shown in the following tables 3, 4 and 5. Tables 3, 4 and 5 show transmission of ACK/NACK multiplexing at M=2, M=3, and M=4, respectively. If bits b(0),b(1) are mapped to N/A, the UE does not transmit the ACK/NACK response at the subframe (n).

TABLE 3

| HARQ-ACK(0), HARQ-ACK(1) | $n_{PUCCH}^{(1)}$ | b(0), b(1) |
| --- | --- | --- |
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

TABLE 4

| HARQ-ACK(0), HARQ-ACK(1), HARQ-ACK(2) | $n_{PUCCH}^{(1)}$ | b(0), b(1) |
| --- | --- | --- |
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | N/A | N/A |

TABLE 5

| HARQ-ACK(0), HARQ-ACK(1), HARQ-ACK(2), HARQ-ACK(3) | $n_{PUCCH}^{(1)}$ | b(0), b(1) |
| --- | --- | --- |
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Tables 3, 4 and 5, HARQ-ACK(i) is the result of HARQ ACK/NACK/DTX at the i-th data unit (where $0 \leq i \leq 3$). Discontinuous transmission (DTX) means that a data unit corresponding to HARQ-ACK(i) is not present or a UE does not detect the presence of the data unit corresponding to HARQ-ACK(i). For convenience of description and better understanding of the present invention, the terms 'HARQ-ACK' and 'ACK/NACK' may be used interchangeably. In association with each data unit, a maximum of 4 PUCCH resources (i.e., $n_{PUCCH,0}^{(1)} \sim n_{PUCCH,3}^{(1)}$) may be occupied. The multiplexed ACK/NACK information is transmitted through one PUCCH resource selected from among the occupied PUCCH resources. $n_{PUCCH,x}^{(1)}$ shown in Tables 3, 4 and 5 means PUCCH resources used for actual ACK/NACK transmission. 'b(0)b(1)' means two bits transmitted through the selected PUCCH resources, and the two bits 'b(0)b(1)' are QPSK-modulated. For example, if a UE succeeds in decoding 4 data units as shown in Table 5, the UE transmits (1,1) to the base station through PUCCH resources connected to $n_{PUCCH,1}^{(1)}$. Since the number of combinations of PUCCH resources and QPSK symbols is insufficient to represent all the ACK/NACK assumptions, NACK and DTX are coupled to each other (denoted by NACK/DTX) in the remaining cases other than some cases.

DL Assignment Index for TDD System

DL-related PDCCH (for example, PDCCH DCI formats 0, 1, 1A, 1B, 1D, 2, 2A, etc.) may include a downlink assignment index (DAI) field. The DAI field includes information regarding an index assigned to a subframe for enabling a PDSCH to be transmitted in a TDD system. When transmitting UL ACK/NACK of a PDSCH using the DAI field, information regarding the number of PDSCHs to be transmitted through ACK/NACK resources of one UL subframe can be obtained. A detailed description of the DAI field will be given below.

Differently from the FDD system, the TDD system divides the same frequency band into a DL subframe and a UL subframe on a time axis, and uses the resultant DL and UL subframes. Therefore, if asymmetrical data traffic occurs in DL/UL, many more DL subframes than UL subframes may be assigned or many more UL subframe than DL subframes may also be assigned as necessary. Differently from the FDD system, a DL subframe may not be mapped to a UL subframe on a one to one basis. Specifically, if the number of DL subframes is higher than the number of UL subframes, there may unexpectedly occur a specific situation in which ACK/NACK responses of several PDSCHs transmitted on several DL subframes should be processed in one UL subframe.

In this way, when several PDSCHs are transmitted to one UE in several DL subframes, the base station transmits one PDCCH to each PDSCH. In this case, in response to the received PDSCHs, the UE may transmit ACK/NACK information through one PUCCH belonging to one UL subframe.

The scheme for transmitting one ACK/NACK information upon receiving several PDSCHs can be largely classified into the ACK/NACK bundling scheme and the PUCCH selection transmission scheme.

In accordance with the ACK/NACK bundling transmission scheme, if several PDSCHs received in the UE are successfully decoded, one ACK signal is transmitted through one PUCCH. In other cases (i.e., if at least one of PDSCHs fails to be decoded), a NACK signal is transmitted.

In accordance with the PUCCH selection (or channel selection) transmission scheme, a UE receiving several PDSCHs occupies several PUCCHs that are capable of being used for ACK/NACK transmission using the arbitrary scheme, determines which one of occupied PUCCHs is selected to transmit ACK/NACK information (i.e., information indicating which channel is selected is used as an information bit), and may transmit a plurality of ACK/NACK information by applying the combination of modulated/coded contents to the selected/transmitted PUCCH. For example, in the case where one of two PUCCHs is selected and ACK/NACK information composed of 'a' bits is transmitted to the selected PUCCH, information of 1 bit can be represented by the selected one of two PUCCHs, such that ACK/NACK information composed of (a+1) bits can be transmitted.

In the case where the UE transmits the ACK/NACK signal to the base station using the above-mentioned schemes, it may be assumed that some parts of PDCCHs that have been transmitted from the base station during a plurality of subframe intervals may not be received in the UE (i.e., the UE may miss some parts of PDCCHs). In this case, it is impossible for the UE to recognize whether a PDSCH corresponding to the missing PDCCH is transmitted to the UE, resulting in the occurrence of errors in ACK/NACK generation.

In order to solve the above-mentioned errors, the TDD system includes a downlink assignment index (DAI) in a PDCCH, such that it can indicate the number of PDCCHs to be transmitted to ACK/NACK resources of one UL subframe. For example, if one UL subframe is mapped to N DL subframes, PDCCHs transmitted to N DL subframe intervals are sequentially indexed (i.e., sequentially counted), such that the UE can recognize whether a PDCCH has been normally received on the basis of DAI information contained in the PDCCH.

Figure 7:
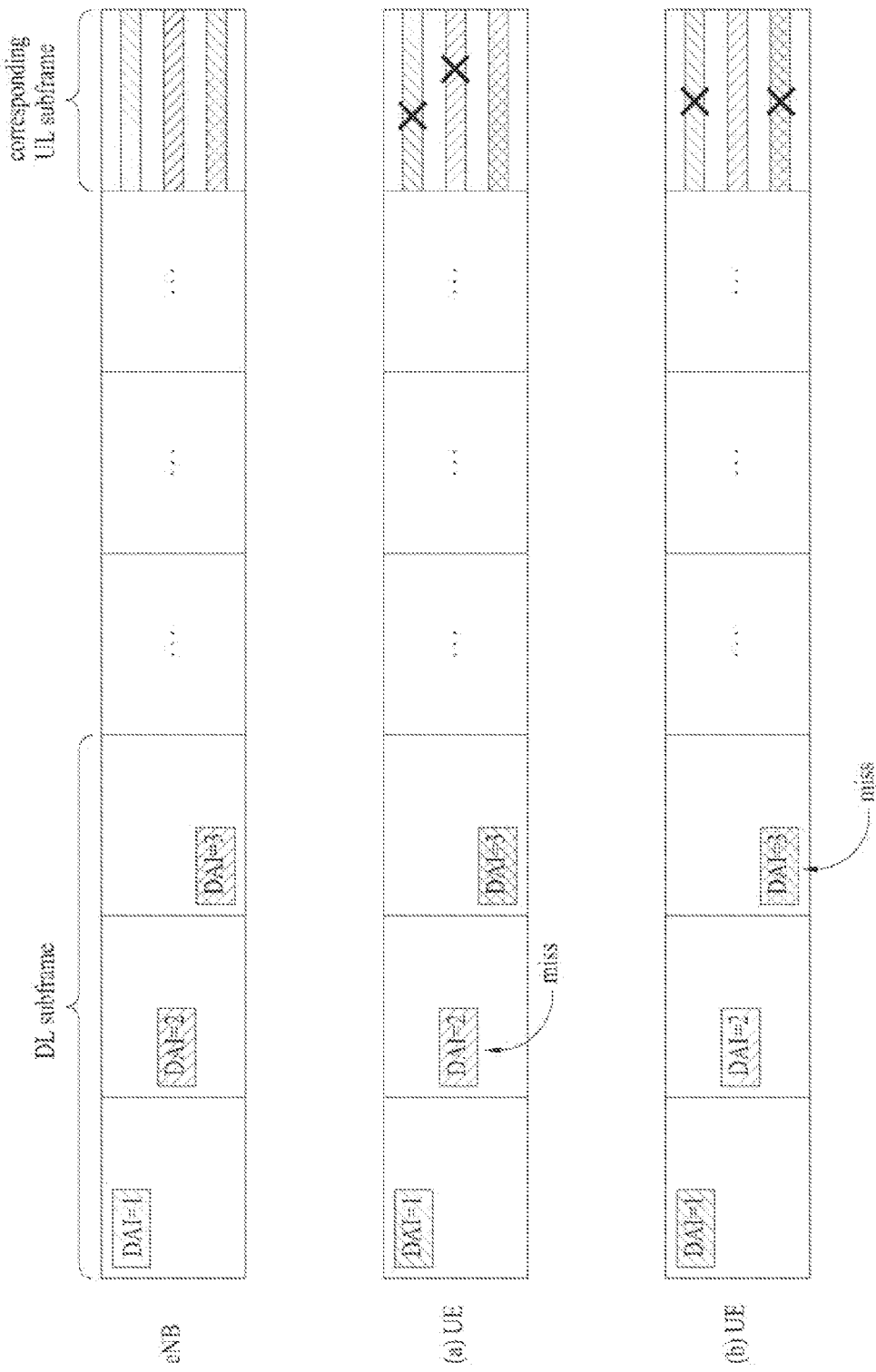
FIG. 7 shows ACK/NACK signals to be transmitted in the case where a UE for use in a TDD system does not receive one of PDCCHs.

FIG. 7 shows ACK/NACK signals to be transmitted in the case where a UE for use in a TDD system does not receive one of PDCCHs. For example, as can be seen from FIG. 7, one UL subframe is mapped to three DL subframes (i.e., 3 DL:1 UL).

FIG. 7(a) shows that a UE missed a second PDCCH. In more detail, as can be seen from FIG. 7(a), the UE receives a PDCCH of DAI=1 and then receives a PDCCH of DAI=3. In this case, since a DAI (=3) of a third PDCCH acting as the last PDCCH is different from the number (i.e., 2) of received PDCCHs, the UE recognizes that the second PDCCH has been missed, such that it can transmit ACK/NACK information according to the recognized result.

On the other hand, FIG. 7(b) shows that a UE has missed the last PDCCH (i.e., the third PDCCH). That is, as can be seen from FIG. 7(b), after the UE receives a PDCCH of DAI=1 and receives a PDCCH of DAI=1, the UE does not receive a PDCCH of DAI=3. In this case, a DAI index of the last received PDCCH is identical to the number of received PDCCHs, such that the UE is unable to recognize the loss of the last PDCCH. Therefore, the UE may recognize that only two PDCCHs have been scheduled during the DL subframe interval. In this case, ACK/NACK information may be transmitted as PUCCH resources corresponding to DAI=2 instead of PUCCH resources corresponding to DAI=3, such that the base station may recognize that the UE has missed a PDCCH including DAI=3.

ACK/NACK Information Transmission Scheme for Use in Carrier Aggregation (CA) System A method for supporting carrier aggregation (CA) that uses multiple carriers has been discussed in the development process of a system (for example, 3GPP LTE-A system) evolved from the legacy wireless communication system (for example, 3GPP LTE Release-8 or Release-9 system). The evolved system is designed to support multiple carriers and/or multiple layers (multiple transport blocks (TBs) or multiple codewords (CWs)), whereas the legacy system is designed to support a single carrier and a single layer in UL transmission. Therefore, it is impossible for the evolved system to use the ACK/NACK transmission scheme designed in the legacy system without change. As a result, there is needed a new ACK/NACK transmission scheme.

The ACK/NACK aggregation or bundling capable of being applied to the multicarrier-supporting system will hereinafter be described in detail.

Figure 8:
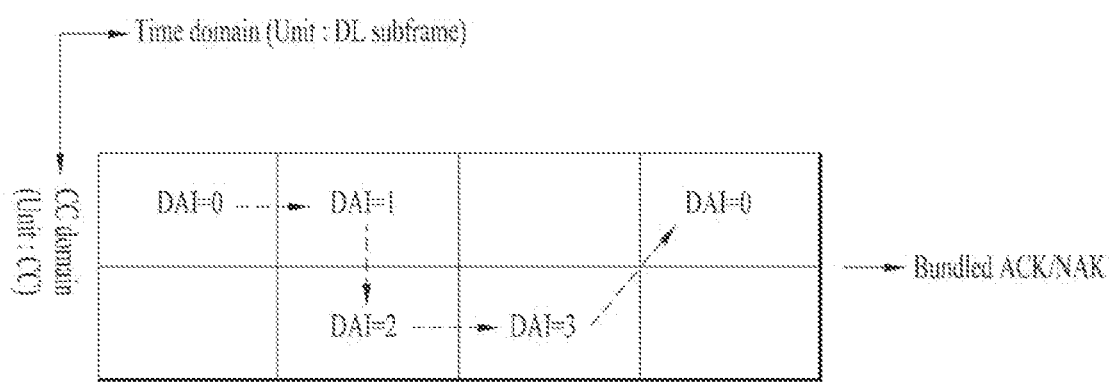
FIG. 8 shows exemplary ACK/NACK bundling applicable to both a time domain and a CC domain.

FIG. 8 shows exemplary ACK/NACK bundling applicable to both a time domain and a CC domain. The ACK/NACK bundling of FIG. 8 may be referred to as 'full bundling'. In other words, the full bundling means that ACK/NACK bundling is applied in consideration of subframes of a time domain and CCs of a CC domain. In addition, ACK/NACK bundling may be simultaneously applied to some parts of the time domain and some parts of the CC domain.

FIG. 9 shows exemplary ACK/NACK bundling applicable to either one of a time domain and a CC domain. The ACK/NACK bundling of FIG. 9 may be referred to as partial bundling. That is, the partial bundling means that ACK/NACK bundling is applied to subframes of the time domain or CCs of the CC domain. FIG. 9(a) shows an example of ACK/NACK bundling applied to several subframes of a time domain in one carrier of the CC domain. FIG. 9(b) shows an example of ACK/NACK bundling applied to several carriers of the CC domain in one subframe of the time domain. In addition, the ACK/NACK bundling may be applied to some parts of the time domain or may also be applied to some parts of the CC domain.

Although the full bundling of FIG. 8 or the partial bundling of FIG. 9 can support only one method in a specific system, it should be noted that they can also support all of the two methods.

In the example of ACK/NACK full bundling of FIG. 8, DAI may be used as a CC-first pure-counter. That is, DAI increases in the order of CCs as a counter for pure DL assignment accumulated within a frame, and a DAI value has a continuously increased value at the next subframe. As can be seen from the example of FIG. 8, DAI=1 is assigned to a first carrier in the second subframe, and DAI=2 is assigned to a second carrier in the second subframe. DAI=3 is assigned to a second carrier in the next subframe (i.e., third subframe). The example of FIG. 8 assumes a 2-bit DAI having the same size as that of a DAI defined in the LTE Release-8, such that a DAI value is assigned by modular-4 calculation.

In the case of using a DAI as in the example of FIG. 8, a UE can determine the presence or absence of missing PDCCH on the basis of continuity of a DAI value of the detected PDCCH. However, if the last PDCCH(s) located at the temporally rear part within the frame are missed, it is impossible for the UE to recognize the presence or absence of missing PDCCH. Therefore, the UE may report the bundled ACK/NACK information (where, DTX may be distinguished from ACK and NACK, and may be considered to be identical to NACK as necessary), the last UE-detected PDCCH information (e.g., a DAI value of the last detected PDCCH), or the number of UE-detected PDCCHs to the base station. Therefore, the base station can detect a correct PDCCH detection state of the UE. For the above-mentioned report, two information units may be configured as separate bits, and the two information units are modulated (i.e., are constellation-mapped) such that the above-mentioned report can be achieved.

For example, provided that the bundled ACK/NACK information (composed of 1 bit) and a DAI value (composed of 2 bits) finally detected by the UE are reported, not only one bit for the bundled ACK/NACK but also 2 bits for the last detected DAI value are further needed. On the other hand, if the bundled ACK/NACK information and the DAI are mapped to constellation, the above-mentioned two information units may also be reported using QPSK through the overlapped mapping of a specific DAI value. For example, if the bundled ACK/NACK is set to NACK, (0,0) may be transmitted. If the bundled ACK/NACK is set to ACK and the last DAI is set to 0 or 3, (0,1) may be transmitted. If the bundled ACK/NACK is set to ACK and the last DAI is set to 1, (1,0) may be transmitted. If the bundled ACK/NACK is set to ACK and the last DAI is set to 2, (1,1) may be transmitted. As a result, the above-mentioned scheme can reduce the size of transmission bits as compared to the scheme for separately transmitting the bundled ACK/NACK and the last detected DAI value.

On the other hand, in case of the ACK/NACK bundling, an ACK/NACK state for each DL transmission may be incorrectly indicated. For example, provided that the ACK/NACK bundling is performed through a logical AND operation and two DL transmissions are used, if each of the two DL transmissions is determined to be ACK, this means the case of 'ACK'. Otherwise, if only one of two DL transmissions is determined to be NACK or if all of two DL transmission is determined to be NACK, this means the case of 'NACK', resulting in reduction in ACK/NACK accuracy. Therefore, the ACK/NACK bundling may not be carried out to increase the ACK/NACK accuracy, and this state may be referred to as ACK/NACK full multiplexing. In other words, in case of the ACK/NACK full multiplexing, ACK/NACK states of individual DL transmissions may be represented, and a more correct and efficient HARQ operation may be supported. An exemplary case in which the application of ACK/NACK full multiplexing is limited by a maximum payload size supported in a used channel structure (or PUCCH format) will hereinafter be described with reference to FIG. 10.

Figure 10:
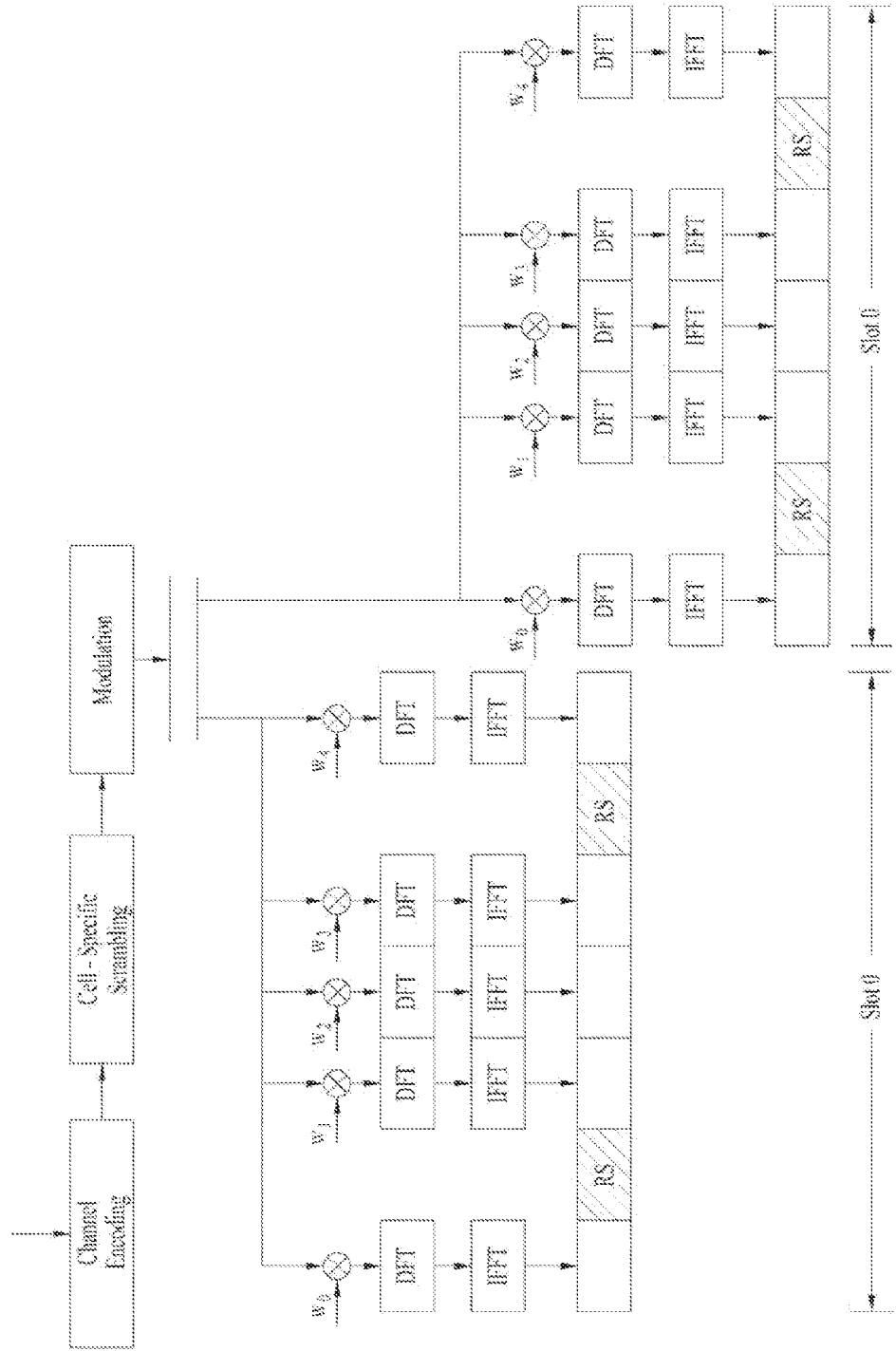
FIG. 10 shows an exemplary case in which the application of ACK/NACK full multiplexing is limited by a maximum payload size supported in an ACK/NACK channel structure.

FIG. 10 exemplarily shows a PUCCH channel structure having a spreading factor (SF) of 5. If SF is set to 5 (SF=5), an orthogonal code (for example, $\{w_0, w_1, \ldots, w_4\}$) of length=5 may be used as a spreading cover. PUCCH multiplexing capability may be increased by the spreading factor (SF). That is, UL control information from each UE can be discriminated and multiplexed using the orthogonal codes on the same RB. In the PUCCH format of FIG. 10, it is assumed that the size of a maximum supportable payload is 20 bits. In other words, in case of using the PUCCH format of FIG. 10, it is impossible to transmit ACK/NACK bits of more than 20 bits. The PUCCH format of FIG. 10 may be referred to as PUCCH format 3 in such a manner that the PUCCH format of FIG. 10 can be distinguished from PUCCH formats of the legacy LTE Release-8.

For example, if the LTE-A TDD system supports a maximum of 5 carriers and the ratio of DL:UL is set to 4:1, it may be assumed that a maximum of 2 codewords (CWs) are transmitted in one DL subframe through one carrier and associated ACK/NACK transmission is needed. In this case, the size of payload required for the ACK/NACK full multiplexing is 40 bits. In more detail, ACK/NACK information for each CW requires one bit such that 2 bits are needed for ACK/NACK information for each PDCCH. In addition, in order to represent ACK/NACK information for 5 carriers and four DL subframes, 40 (=2*5*4) bits are needed. However, the PUCCH format of FIG. 10 supports transmission of a maximum of 20 bits, such that it is impossible to transmit ACK/NACK information composed of 40 bits.

In this case, the channel structure for transmitting ACK/NACK information as shown in FIG. 10 has been disclosed only for illustrative purposes, the embodiments of the present invention may also be applied to other channel structures that are capable of transmitting much more information than the PUCCH format 1a/1b defined in the legacy LTE Release-8. In other words, the embodiment of the present invention provides, in an arbitrary channel structure having a predefined payload size X (where X is an arbitrary value and not limited only to 20) capable of being used to transmit ACK/NACK information, a method for more efficiently transmitting ACK/NACK information of more than X using a carrier aggregation (CA) and/or TDD system.

Basically, if the size of ACK/NACK information to be transmitted is larger than the predefined payload size X, the ACK/NACK information is bundled so that the size of the ACK/NACK information can be reduced. However, as described above, the ACK/NACK full multiplexing can support more correct and efficient HARQ operations than the ACK/NACK bundling, such that it is preferable that ACK/NACK multiplexing capable of expressing original ACK/NACK information be applied within a limited payload size (X). For this purpose, provided that the ACK/NACK full multiplexing is applied and ACK/NACK information to be transmitted is larger than the maximally supportable payload size or the predefined payload size (X) in a specific channel structure (or PUCCH format) for ACK/NACK transmission, the embodiment of the present invention performs spatial bundling so as to transmit ACK/NACK information. As a result, ACK/NACK transmission can be effectively supported in the carrier aggregation (CA) system.

In this case, the spatial bundling means that ACK/NACK information of multiple codewords (CWs) is bundled. For example, if two codewords (CWs) are present in one PDSCH in case of MIMO transmission or the like, ACK/NACK information of two CWs can be bundled by the spatial bundling.

In addition, as described above, the ACK/NACK response occurs in the following three cases. In the first case, an ACK/NACK response is generated in response to PDSCH transmission indicated by PDCCH detection. In the second case, an ACK/NACK response is generated in response to a PDCCH indicating SPS release. In the third case, an ACK/NACK response (i.e., ACK/NACK for SPS transmission PDSCH) is generated in response to a PDSCH that is transmitted without PDCCH. In association with the ACK/NACK multiplexing or ACK/NACK bundling of the present invention, it should be noted that the multiplexed/bundled ACK/NACK explicitly includes all the ACK/NACK responses of PDCCH and PDSCH. For convenience of description and better understanding of the present invention, the above-mentioned multiplexed/bundled ACK/NACK may be represented by ACK/NACK multiplexing or ACK/NACK bundling for PDCCHs/PDSCHs.

In the following description, although the bundling may be carried out by logical AND operation defined in the LTE Release-8, the scope or spirit of the present invention is not limited thereto, and the bundling can also be carried out by other operation methods (e.g., logical OR). In other words, the term 'bundling' refers to a method for expressing multiple ACK/NACK information using a small number of bits (i.e., a method for expressing ACK/NACK information of M bits using N bits, where M≥N).

In addition, in the following description, the ACK/NACK status can be classified into an ACK status and a NACK status for convenience of description. The scope or spirit of the present invention is not limited thereto, and a specific status in which a UE does not detect the assigned PDCCH or a DTX status in which a UE serving as a receiver/detector does not know the presence of PDCCH assigned to the UE may be mapped to NACK. In other words, the ACK/NACK status may be classified into an ACK status and a NACK/DTX status. In so far as there is no additional limitation in the following description, ACK means the ACK status, and NACK means the NACK/DTX status.

The principles of the present invention will hereinafter be described in detail.

As described above, provided that a specific channel structure (or PUCCH format) is used for ACK/NACK transmission, a maximally supportable payload size (or a predetermined payload size) is denoted by X. In this case, although X is exemplarily set to 20 for convenience of description, the scope or spirit of the present invention is not limited thereto. That is, X may be defined as a predefined arbitrary value.

First, if the ACK/NACK information to be transmitted is larger than X, the spatial bundling may be used. If the size of ACK/NACK information is identical to or less than X, no spatial bundling may be used. In the case of simply determining whether or not the spatial bundling is applied, the spatial bundling may be applied to the entire ACK/NACK information even if the size of ACK/NACK information to be transmitted is slightly larger than X. In the case of applying the spatial bundling, each ACK/NACK information is not explicitly fed back, the efficiency of the HARQ operation may be deteriorated, such that there is needed a method for transmitting individual ACK/NACK information without ACK/NACK bundling at maximum.

Therefore, according to the present invention, if the size of ACK/NACK information to be transmitted is larger than X, the spatial bundling is carried out according to predetermined rules (to be described later in detailed examples of the present invention), so that the size of ACK/NACK transmission payload may be set to X or less or may be most approximate to X. For example, the spatial bundling is applied only to some parts of the entire ACK/NACK information to be transmitted, such that individual ACK/NACK feedback can be maximally transmitted within a predetermined payload size X.

In addition, it may be assumed that there are a plurality of channel structures (or PUCCH formats) for transmitting ACK/NACK information in a specific system. In this case, individual formats may be assigned different X values as necessary. In brief, if the size of ACK/NACK information to be transmitted is larger than the predefined payload size X in association with an arbitrary channel for ACK/NACK transmission, the spatial bundling is applied to obtain the ACK/NACK transmission payload of X or less, such that ACK/NACK information can be efficiently transmitted.

In the following description of the present invention, in order to generate transmission payload of less than X using the simple rules, the spatial bundling may be applied in units of a carrier or subframe. That is, if the size of original ACK/NACK information depending on the ACK/NACK full multiplexing is larger than X, the spatial bundling may be carried out either in a predetermined number of carriers from among all the carriers or in a predetermined number of subframes from among all the subframes (i.e., subframes contained in one radio frame). In the remaining carriers or subframes, ACK/NACK information may be generated and transmitted without applying the spatial bundling. Accordingly, a transmission payload size that is identical to or most approximate to the maximally transmittable payload size can be maintained in the ACK/NACK channel structure of a specific format, and at the same time a large amount of information can be efficiently transmitted.

Variables used in the embodiments of the present invention can be defined as follows.

$N_{configured\ CCs}$ is the number of UE-specific configured carriers.

$N_{bundling\ windows}$ is the size of a bundling window and is denoted in units of a subframe.

The bundling window does not mean a specific unit in which actual bundling is performed in a time domain and/or a CC domain. In more detail, in the case where an ACK/NACK response to transmission data on one or more DL subframes is transmitted through one PUCCH, the bundling window means the set or aggregate of one or more DL subframes.

$N_{total\ CWs}$ is a total number of codewords (CWs) assigned over all carriers established in one subframe on the condition that there is no bundling. In more detail, $N_{total\ CWs}$ may be a total number of codewords (CWs) scheduled in one subframe within the actually assigned PDCCHs/PDSCHs. Differently from the above-mentioned description, a maximum number of codewords (CWs) for each carrier, instead of the number of codewords actually assigned to a UE, is pre-notified of the UE, and the UE may determine $N_{total\ CWs}$ by multiplying the maximum number of codewords (CWs) by the number of configured carriers. In other words, provided that a maximum number (e.g., 1 or 2) of supportable CWs configured in the i-th CC (Component Carrier) is set to $N_{CW,i}$, $N_{total\ CWs}$ is the sum of $N_{CW,i}$ covering all CCs. Therefore, $N_{total\ CWs}$ is always identical to or higher than $N_{configured\ CCs}$. For clarity, the principles of the present invention is described using the term codeword, and "codeword" may be substituted with "transport block" in the description of the present invention.

$N_{total\ A/N}$ is a total number of ACK/NACK bits of DL transmission covering all carriers configured in all subframes contained in the bundling window on the condition that there is no bundling. In addition, $N_{total\ A/N}$ may be a total number of CWs scheduled in the bundling window within the actually assigned PDCCHs/PDSCHs. Differently from the above-mentioned description, a maximum number of CWs for each carrier, instead of the number of CWs actually assigned to a UE, is pre-notified of the UE, and the UE may determine a total number of ACK/NACK bits of one subframe by multiplying the number of configured carriers by the maximum number of CWs. The determined result is extended to all the subframes belonging to the bundling window such that $N_{total\ A/N}$ can be determined. According to the above-mentioned method, $N_{total\ A/N}$ is denoted by $N_{total\ CWs} \times N_{bundling\ windows} (N_{total\ A/N} = N_{total\ CWs} \times N_{bundling\ windows})$.

Figure 11:
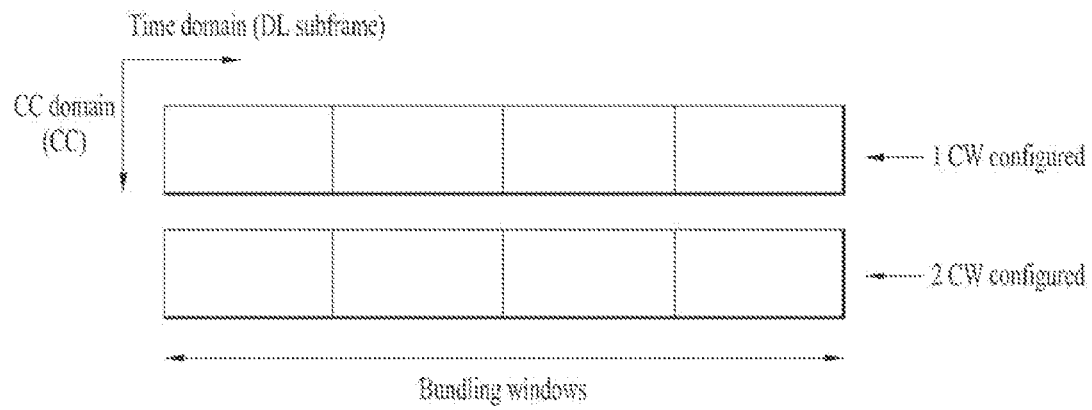
FIG. 11 shows an exemplary bundling window for use in a multicarrier system.

FIG. 11 shows an exemplary bundling window for use in a multicarrier system. Various definitions of the above-mentioned variables will hereinafter be described with reference to FIG. 11. In the example of FIG. 11, $N_{configured\ CCs}$ is set to 2, and $N_{bundling\ windows}$ is set to 4. Provided that a maximum number of CWs for each carrier is pre-notified of a UE, that is, provided that a maximum of one CW is assigned to a first carrier and a maximum of two CWs is assigned to the second carrier, $N_{total\ CWs}$ is set to 3 (=1CW+2CWs), $N_{total\ A/N}$ is set to 12 (=(1CW+2CWs)*4 subframes). Namely, $N_{total\ A/N} = N_{total\ CWs} * N_{bundling\ windows}$.

In the following description, for convenience of description and better understanding of the present invention, a maximum number of CWs for each carrier is pre-defined of a UE, and the UE can determine $N_{total\ A/N}$ and $N_{total\ CWs}$ on the basis of the maximum number of CWs for each carrier.

In the following description, for convenience of description, it is assumed that a maximum number of CWs for each carrier is pre-notified of a UE and the UE determines $N_{total\ A/N}$ and $N_{total\ CWs}$ values on the basis of the maximum number of CWs for each carrier. However, the scope or spirit of the present invention is not limited thereto, and the principles of the present invention can be equally applied even when the number of CWs covering all carriers contained in one subframe on the basis of the number of actually assigned CWs is denoted by $N_{total\ CWs}$ as described above, and the number of ACK/NACK bits corresponding to the number of CWs covering all subframes and all carriers contained in the bundling window is denoted by $N_{total\ A/N}$.

Next, a method for performing the spatial bundling according to the embodiment of the present invention will hereinafter be described in detail.

Although the spatial bundling is performed in all subframes and all carriers of the bundling window in the case of $N_{configured\ CCs} \cdot N_{bundling\ windows} > X$ (for example, X=20), it is necessary to transmit ACK/NACK information composed of X bits or more. Therefore, it is impossible to perform the ACK/NACK full multiplexing in the above-mentioned case. In the case where the ACK/NACK full multiplexing is established by a higher layer, it is preferable that the ACK/NACK full multiplexing is not performed under the above-mentioned condition. In addition, if a UE in which ACK/NACK full multiplexing is established stays in the above-mentioned condition, it is preferable that the corresponding UE disregards the full multiplexing configuration and transmits ACK/NACK information using other transmission methods (e.g., spatial bundling in a time domain, spatial bundling in a CC domain, or full bundling) according to a predetermined rule.

In case of $N_{total\ CWs} \cdot N_{bundling\ windows} = X$ (for example, X=20), the spatial bundling should be performed in all subframes and all carriers contained in the bundling window. In other words, under the above-mentioned condition, the spatial bundling should be applied to ACK/NACK information in all subframes-carriers in which 2-CW transmission is scheduled, such that ACK/NACK transmission can be correctly carried out through a channel (or PUCCH format) supporting X-bit payload without exceeding X bits.

Embodiment 1

Embodiment 1 shows a method for performing the spatial bundling at a specific carrier (i.e., at a carrier level). The spatial bundling at a carrier level means that the spatial bundling is performed at all subframes of a specific carrier.

In the following description, it is assumed that the maximum size of payload supportable in a specific channel structure (or PUCCH format) for ACK/NACK transmission is set to X (e.g., X=20).

If the size of ACK/NACK payload to be transmitted is larger than X, the spatial bundling is performed in specific carrier(s) according to the predetermined rule such that the size of transmission payload can be smaller than X. The present invention proposes the rule for applying the carrier level spatial bundling to generate transmission payload of less than X according to the simple rule. In other words, if the original ACK/NACK payload size is larger than X, the spatial bundling is performed in a predetermined number of carriers and the ACK/NACK information can be generated and transmitted without applying the spatial bundling in the remaining carriers other than the predetermined number of carriers.

Figure 12:
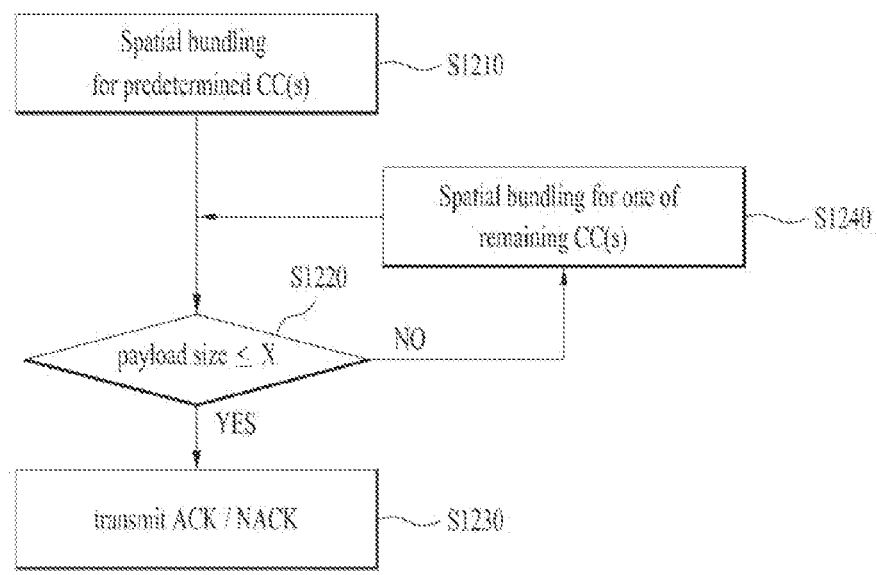
FIG. 12 shows an example of carrier level spatial multiplexing.

FIG. 12 shows an example of carrier level spatial multiplexing.

Referring to FIG. 12, the spatial bundling is performed on ACK/NACK information in association with transmission of some CCs from among the UE-configured CCs within the bundling window at step S1210. Some CCs may be determined according to the predetermined rule.

For example, according to the predetermined rule, CC (s) including transmission of 2 CWs (or transmission of a maximum of 2 CWs is configured/established) from among all CCs contained in the bundling window may be determined, and N carriers (where N≥1) from among the corresponding CCs may be determined in descending (or ascending) numerical order of CC indexes. The CC index may be a physical CC index or a logical CC index. Alternatively, according to the predetermined rule, the spatial bundling may be primarily applied to SCell, or the spatial bundling may be primarily applied to PCell.

Preferably, the spatial bundling of the PCell may have the lowest priority, such that individual ACK/NACK information can be transmitted in the PCell within the limit of the possible. For example, if PCell has the lowest carrier index, in order to support the PCell, the spatial bundling can be primarily applied to a cell having the highest carrier index from among cells in which transmission of a maximum of 2 CWs is configured, and is then sequentially applied to the remaining cells arranged in descending numerical order.

However, the above-mentioned rules are disclosed only for illustrative purposes, and an arbitrary rule for selecting some carriers from among all carriers can be used.

In step S1220, it is determined whether the size of all ACK/NACK payload contained in the bundling window is identical to or less than X according to the result of spatial bundling of the step S1210. If the size of ACK/NACK payload is identical to or less than X, the step S1230 is performed. If the size of ACK/NACK payload is higher than X, the step S1240 is performed.

In step S1230, if the size of the resultant ACK/NACK payload obtained by the spatial bundling is identical to or less than X, ACK/NACK information is transmitted using the corresponding ACK/NACK channel (or PUCCH format).

In step S1240, if the size of ACK/NACK payload is still larger than X, the spatial bundling is additionally performed to one of the remaining CCs to which no spatial bundling has been applied in the previous operation. Deciding any one of the remaining CCs may be dependent upon the predetermined rules. The predetermined rule may determine one CC from among the remaining CCs contained in the bundling window according to the descending (or ascending) numerical order of CC indexes. However, the above-mentioned rule is disclosed only for illustrative purposes, and an arbitrary rule for determining one of the remaining CCs may be applied as necessary.

Therefore, the spatial bundling may be repeatedly applied in units of a carrier until the size of ACK/NACK payload is reduced to X or less, and the ACK/NACK information having a payload size of X or less can be transmitted.

On the other hand, instead of using the above-mentioned sequential repetition operation, information as to whether the spatial bundling is performed in a predetermined number of CCs is determined at once by an equation, such that the spatial bundling for adjusting the ACK/NACK payload size to be X or less without any repetition operation can be carried out. Detailed examples of the present invention will be described in detail. In the following description, the possibility of applying ACK/NACK full multiplexing to 2 configured CCs, 3 configured CCs, 4 configured CCs or 5 configured CCs and the rule of applying the spatial bundling of a CC level will hereinafter be described.

Embodiment 1-1

In the case where 2 CCs are configured in the UE, the spatial bundling can be applied to specific CCs from among 2 configured CCs not to exceed the predefined payload size X, as shown in the following table 6. In Table 6, X is set to 20 (X=20), and it is assumed that a maximum number of CWs in each CC is set to 2. In the case where the bundling window size is set to 2, 3, 4, or 9, the number of bits required for ACK/NACK transmission is shown in Table 6.

mitted needs to be set to 20 bits or less using the spatial bundling. For this purpose, according to the above-mentioned three cases, it is necessary to perform the spatial bundling for all PDCCHs/PDSCHs in all subframes and all CCs contained in the bundling window. In accordance with the present embodiment, since the spatial bundling is performed in 2 CWs, the spatial bundling is not actually performed even in the case where the number of CWs belonging to a specific carrier or specific subframe is set to 1. That is, the spatial bundling application is defined irrespective of the number of CWs in such a manner that the spatial bundling application can be simply defined. If the number of CWs is set to 2, the spatial bundling is applied. If the number of CWs is set to 1, the spatial bundling is not applied.

On the other hand, provided that the number of configured CCs is set to 2, the full multiplexing can be applied without the execution of spatial bundling when the bundling window size is set to 9 or others (for example, if the bundling window size is set to 2, 3 or 4).

TABLE 6

| No. of configured CC (a) | No. of CW for each CC | Size of bundling window (b) [subframe] | (a) * (b) | Size of A/N payload [state] Full multiplexing | No. of spatial bundling CCs | Full multiplexing with spatial bundling |
|---|---|---|---|---|---|---|
| 2 | 1/1 | 2 | 4 | 2 + 2 = 4 | 0 | |
|   |     | 3 | 6 | 3 + 3 = 6 | 0 | |
|   |     | 4 | 8 | 4 + 4 = 8 | 0 | |
|   |     | 9 | 18 | 9 + 9 = 18 | 0 | |
|   | 2/1 | 2 | 4 | 4 + 2 = 6 | 0 | |
|   |     | 3 | 6 | 6 + 3 = 9 | 0 | |
|   |     | 4 | 8 | 8 + 4 = 12 | 0 | |
|   |     | 9 | 18 | 18 + 9 = 27 | 1 | 9 + 9 |
|   | 1/2 | 2 | 4 | 2 + 4 = 6 | 0 | |
|   |     | 3 | 6 | 3 + 6 = 9 | 0 | |
|   |     | 4 | 8 | 4 + 8 = 12 | 0 | |
|   |     | 9 | 18 | 9 + 18 = 27 | 1 | 9 + 9 |
|   | 2/2 | 2 | 4 | 4 + 4 = 8 | 0 | |
|   |     | 3 | 6 | 6 + 6 = 12 | 0 | |
|   |     | 4 | 8 | 8 + 8 = 16 | 0 | |
|   |     | 9 | 18 | 18 + 18 = 36 | 2 | 9 + 9 |

In Table 6, 'Size of A/N payload' means the combination of bits for each CC, namely, a total number of transmission bits. For example, in the case where the number of CWs for each CC is set to 1 (No. of CW for each CC=1/1) and the size of bundling window is set to 2, 2 bits is required for each CC when full multiplexing is applied, and if bit numbers for 2 CCs are summed, payload of 4 bits (2+2=4) is needed.

In the case where 2 CCs are configured as shown in Table 6 and the full multiplexing is applied to three cases from among 16 cases, the number of ACK/NACK bits to be transmitted may unexpectedly exceed 20 bits. The above-mentioned three cases disclose that the size of bundling window is set to 0 at rare intervals.

In the case where the number of configured CCs is set to 2 and any one of two CCs has 2 CWs or less and the bundling window size is set to 9, it is impossible to use the full multiplexing (pure full multiplexing to which no spatial bundling is applied). In this case, the ACK/NACK payload to be trans- Therefore, provided that the number of configured CCs is set to 2 irrespective of the number of CWs, the spatial bundling can be performed using the following equation 5.

If $N_{configured\ CCs}=2$ and $N_{bundling\ windows}=9$, [Equation 5]

spatial bundling for all PDCCHs/PDSCHs (CCs and subframes)

Embodiment 1-2

In the case where three CCs are configured in the UE, the spatial bundling can be applied to specific CCs from among 3 configured CCs not to exceed the predefined payload size X, as shown in the following table 7. In Table 7, X is set to 20 (X=20), and it is assumed that a maximum number of CWs in each CC is set to 2. In the case where the bundling window size is set to 2, 3, 4, or 9, the number of bits required for ACK/NACK transmission is shown in Table 7.

TABLE 7

| No. of configured CC (a) | No. of CW for each CC | Size of bundling window (b) [subframe] | Size of A/N payload [state] | | No. of spatial bundling CCs | Full multiplexing with spatial bundling |
|---|---|---|---|---|---|---|
| | | | (a) * (b) | Full multiplexing | | |
| 3 | 1/1/1 | 2 | 6 | 2 + 2 + 2 = 6 | 0 | |
| | | 3 | 9 | 3 + 3 + 3 = 9 | 0 | |
| | | 4 | 12 | 4 + 4 + 4 = 12 | 0 | |
| | | 9 | 27 | 9 + 9 + 9 = 27 | | |
| | 2/1/1 | 2 | 6 | 4 + 2 + 2 = 8 | 0 | |
| | | 3 | 9 | 6 + 3 + 3 = 12 | 0 | |
| | | 4 | 12 | 8 + 4 + 4 = 16 | 0 | |
| | | 9 | 27 | 18 + 9 + 9 = 36 | | |
| | 2/2/1 | 2 | 6 | 4 + 4 + 2 = 10 | 0 | |
| | | 3 | 9 | 6 + 6 + 3 = 15 | 0 | |
| | | 4 | 12 | 8 + 8 + 4 = 20 | 0 | |
| | | 9 | 27 | 18 + 18 + 9 = 45 | | |
| | 2/2/2 | 2 | 6 | 4 + 4 + 4 = 12 | 0 | |
| | | 3 | 9 | 6 + 6 + 6 = 18 | 0 | |
| | | 4 | 12 | 8 + 8 + 8 = 24 | 2 or 1 | 8 + 4 + 4 = 16 or 8 + 8 + 4 = 20 |
| | | 9 | 27 | 18 + 18 + 18 | | |

In Table 7, the same or overlapped contents related to the combinations of maximum numbers of CWs for each CC are omitted for convenience of description, and only specific cases having different total sum values of CW numbers from among the combinations are exemplarily disclosed for illustrative purposes. For example, the case that the number of CWs for each CC is 1/2/1 or 1/1/2 can be substantially identical to the other case of 2/1/1 shown in Table 7, as such a detailed description thereof will herein be omitted for convenience of description.

As can be seen from Table 7, for example, if the full multiplexing is applied to the case in which the number of CWs for each CC is set to 1 (i.e., No. of CW for each CC=1/1/1) and the bundling window size is set to 2, 2 bits are required for each CC. If the numbers of bits of three CCs are summed, payload of 6 bits (2+2+2=6) is needed.

As can be seen from Table 7, if 3 CCs are configured and the bundling window size is set to 9, it is impossible to support the full multiplexing irrespective of the application or non-application of the spatial bundling. That is, although the spatial bundling is applied, payload composed of a total of 27 bits exceeding the payload size of 20 bits is needed.

Except for the case in which the bundling window size is set to 9, the ACK/NACK payload exceeds 20 bits in only one case. In this case, the spatial bundling may be carried out according to the predetermined rule.

According to the predetermined rule, provided that 3 CCs are configured, if a maximum number of CWs in all CCs is set to 2 and the bundling window size is set to 4, the spatial bundling may always be performed in all PDCCHs/PDSCHs of one or two CCs of one CC index. In this case, information as to whether the spatial bundling is to be applied to one or two CCs may be predefined between a base station and a user equipment (for example, some rules may be predefined in the standard document). In this way, one or two CCs from among 3 CCs may be determined to be the last one or two CCs. For example, the operation for performing the spatial bundling of all PDCCHs/PDSCHs in the last CCs from among three CCs means that the spatial bundling is not applied to PCell and is applied only to SCells (or SCCs) on the condition that the frontmost index (or the lowest index) from among the logical CC indexes is set to PCell (or PCC).

Therefore, if the number of configured CCs is set to 3, the spatial bundling can be carried out using the following equation 6.

If $N_{configured\ CCs}=3$ and $N_{bundling\ windows}=9$,

No full multiplexing

If $N_{configured\ CCs}=3$ and $(N_{total\ A/N}=N_{total\ CWs} \cdot N_{bundling\ window}>20)$ [Equation 6]

spatial bundling for only the last (logical indexed) CC or spatial bundling except PCC or spatial bundling except the first (logical indexed) CC which has 2 CWs Embodiment 1-3

In the case where four CCs are configured in the UE, the spatial bundling can be applied to specific CCs from among 4 configured CCs not to exceed the predefined payload size X, as shown in the following table 8. In Table 8, X is set to 20 (X=20), and it is assumed that a maximum number of CWs in each CC is set to 2. In the case where the bundling window size is set to 2, 3, 4, or 9, the number of bits required for ACK/NACK transmission is shown in Table 8.

TABLE 8

| No. of configured CC (a) | No. of CW for each CC | Size of bundling window (b) [subframe] | (a) * (b) | Size of A/N payload [state] Full multiplexing | No. of spatial bundling CCs | Full multiplexing with spatial bundling |
|---|---|---|---|---|---|---|
| 4 | 1/1/1/1 | 2 | 8 | 2 + 2 + 2 + 2 = 8 | 0 | |
| | | 3 | 12 | 3 + 3 + 3 + 3 = 12 | 0 | |
| | | 4 | 16 | 4 + 4 + 4 + 4 = 16 | 0 | |
| | | 9 | 36 | 9 + 9 + 9 + 9 | | |
| | 2/1/1/1 | 2 | 8 | 4 + 2 + 2 + 2 = 10 | 0 | |
| | | 3 | 12 | 6 + 3 + 3 + 3 = 15 | 0 | |
| | | 4 | 16 | 8 + 4 + 4 + 4 = 20 | 0 | |
| | | 9 | 36 | 18 + 9 + 9 + 9 | | |
| | 2/2/1/1 | 2 | 8 | 4 + 4 + 2 + 2 = 12 | 0 | |
| | | 3 | 12 | 6 + 6 + 3 + 3 = 18 | 0 | |
| | | 4 | 16 | 8 + 8 + 4 + 4 = 24 | 1 | 8 + 4 + 4 + 4 = 20 |
| | | 9 | 36 | 18 + 18 + 9 + 9 | | |
| | 2/2/2/1 | 2 | 8 | 4 + 4 + 4 + 2 = 14 | 0 | |
| | | 3 | 12 | 6 + 6 + 6 + 3 = 21 | 2 or 1 | 6 + 3 + 3 + 3 = 15 or 6 + 6 + 3 + 3 = 18 |
| | | 4 | 16 | 8 + 8 + 8 + 4 = 28 | 2 | 8 + 4 + 4 + 4 = 20 |
| | | 9 | 36 | 18 + 18 + 18 + 9 | | |
| | 2/2/2/2 | 2 | 8 | 4 + 4 + 4 + 4 = 16 | 0 | |
| | | 3 | 12 | 6 + 6 + 6 + 6 = 24 | 3 or 2 | 6 + 3 + 3 + 3 = 15 or 6 + 6 + 3 + 3 = 18 |
| | | 4 | 16 | 8 + 8 + 8 + 8 = 32 | 3 | 8 + 4 + 4 + 4 = 20 |
| | | 9 | 36 | 18 + 18 + 18 + 18 | | |

In Table 8, the same or overlapped contents related to the combinations of maximum numbers of CWs for each CC are omitted for convenience of description, and only specific cases having different total sum values of CW numbers from among the combinations are exemplarily disclosed for illustrative purposes. For example, the case that the number of CWs for each CC is 1/1/1/2, 1/1/2/1 or 1/2/1/1 can be substantially identical to the other case of 2/1/1/1 shown in Table 8, as such a detailed description thereof will herein be omitted for convenience of description.

As can be seen from Table 8, for example, if the full multiplexing is applied to the case in which the number of CWs for each CC is set to 1 (i.e., No. of CW for each CC=1/1/1/1) and the bundling window size is set to 2, 2 bits are required for each CC. If the numbers of bits of four CCs are summed, payload of 8 bits (2+2+2+2=8) is needed.

As can be seen from Table 8, if 4 CCs are configured and the bundling window size is set to 9, it is impossible to support the full multiplexing irrespective of the application or non-application of the spatial bundling. That is, although the spatial bundling is applied, payload composed of a total of 36 bits exceeding the payload size of 20 bits is needed.

Except for the case in which the bundling window size is set to 9, the ACK/NACK payload exceeds 20 bits in five cases. A method for performing the spatial bundling to each of the above-mentioned five cases (Case 1 to Case 5) will hereinafter be described in detail.

Case 1—In Case 1, from among four configured CCs, the number of CCs, each of which has 2 CWs at maximum, is set to 2, and the number CCs, each of which has one CW at maximum, is set to 2. In the case where the bundling window size is set to 4 and the full multiplexing is supported, the spatial bundling for all PDCCHs/PDSCHs can be performed in one CC from among 2 CCs each having 2 CWs. For example, the last CC (e.g., SCell) from among 2 CCs each having 2 CWs may be determined to be one CC in which the spatial bundling is performed.

Case 2—In Case 2, from among four configured CCs, the number of CCs, each of which has 2 CWs at maximum, is set to 3, and the number CCs, each of which has one CW at maximum, is set to 1. In the case where the bundling window size is set to 3 and the full multiplexing is supported, the spatial bundling for all PDCCHs/PDSCHs can be performed in one or two CCs from among 3 CCs each having 2 CWs. In this case, information as to whether the spatial bundling is applied to one or two CCs may be predefined between a base station and a UE (for example, some rules may be predefined in the standard document). For example, the spatial bundling may be carried out in the last 2 CCs or the last one CC (for example, 2 SCells or 1 SCell) from among 3 CCs each having 2 CWs.

Case 3—In Case 3, from among four configured CCs, the number of CCs, each of which has 2 CWs at maximum, is set to 3, and the number CCs, each of which has one CW at maximum, is set to 1. In the case where the bundling window size is set to 4 and the full multiplexing is supported, the spatial bundling for all PDCCHs/PDSCHs can be performed in two CCs from among 3 CCs each having 2 CWs. For example, the spatial bundling may be carried out in the last 2 CCs (for example, 2 SCells) from among 3 CCs each having 2 CWs.

Case 4—In Case 4, four configured CCs are composed of 4 CCs each having 2 CWs at maximum. In the case where the bundling window size is set to 3 and the full multiplexing is supported, the spatial bundling for all PDCCHs/PDSCHs may be performed in two or three CCs from among four CCs. In this case, information as to whether the spatial bundling is to be applied to two or three CCs may be predefined between a base station and a UE (for example, some rules may be predefined in the standard document). For example, the spatial bundling may be carried out in the last three CCs or the last two CCs (for example, 3 SCells or 2 SCells) from among 4 CCs each having 2 CWs.

Case 5—In Case 5, four configured CCs are composed of 4 CCs each having 2 CWs at maximum. In the case where the bundling window size is set to 4 and the full multiplexing is supported, the spatial bundling for all PDCCHs/PDSCHs may be performed in three CCs from among four CCs. For example, the spatial bundling may be carried out in the last two CCs (for example, 2 SCells) from among 3 CCs each having 2 CWs. Case 5 may also indicate that the spatial bundling is performed in all SCells (SCCs) without being applied to PCell (PCC).

Therefore, if the number of configured CCs is set to 4, the spatial bundling can be carried out using the following equation 7.

If $N_{configured\ CCs}=4$ and $N_{bundling\ windows}=9$,

No full multiplexing

If $N_{configured\ CCs}=4$ and $N_{total\ A/N}(=N_{total\ CWs} \cdot N_{bundling\ windos})>20$, [Equation 7]

spatial bundling for only the last n (logical indexed) CCs among 2 CWs CCs where, n may have different value according to $N_{configured\ CCs}$ and $N_{bundling\ windows}$ or spatial bundling except the first (logical indexed) CC which has 2 CWs Embodiment 1-4

In the case where five CCs are configured in the UE, the spatial bundling can be applied to specific CCs from among 5 configured CCs not to exceed the predefined payload size X, as shown in the following table 9. In Table 9, X is set to 20 (X=20), and it is assumed that a maximum number of CWs in each CC is set to 2. In the case where the bundling window size is set to 2, 3, 4, or 9, the number of bits required for ACK/NACK transmission is shown in Table 8.

In Table 9, the same or overlapped contents related to the combinations of maximum numbers of CWs for each CC are omitted for convenience of description, and only specific cases having different total sum values of CW numbers from among the combinations are exemplarily disclosed for illustrative purposes. For example, the case that the number of CWs for each CC is 1/1/1/1/2, 1/1/1/2/1, 1/1/2/1/1 or 1/2/1/1/1 can be substantially identical to the other case of 2/1/1/1/1 shown in Table 9, as such a detailed description thereof will herein be omitted for convenience of description.

As can be seen from Table 9, for example, if the full multiplexing is applied to the case in which the number of CWs for each CC is set to 1 (i.e., No. of CW for each CC=1/1/1/1/1) and the bundling window size is set to 2, 2 bits are required for each CC. If the numbers of bits of 5 CCs are summed, payload of 10 bits (2+2+2+2+2=10) is needed.

As can be seen from Table 9, if 5 CCs are configured and the bundling window size is set to 9, it is impossible to support the full multiplexing irrespective of the application or non-application of the spatial bundling. That is, although the spatial bundling is applied, payload composed of a total of 45 bits exceeding the payload size of 20 bits is needed.

Except for the case in which the bundling window size is set to 9, the ACK/NACK payload exceeds 20 bits in 9 cases. A method for performing the spatial bundling to each of the above-mentioned nine cases (Case 1 to Case 9) will hereinafter be described in detail.

Case 1—In Case 1, from among five configured CCs, the number of CCs, each of which has 2 CWs at maximum, is set to 1, and the number CCs, each of which has one CW at maximum, is set to 4. In the case where the bundling window size is set to 4 and the full multiplexing is supported, the spatial bundling for all PDCCHs/PDSCHs can be performed in one CC that has 2 CWs. In accordance with the present embodiment, since the spatial bundling is performed to 2 CWs, the spatial bundling is not actually performed to a CC having one CW even though the spatial bundling application

TABLE 9

| | | | | Size of A/N payload [state] | | |
|---|---|---|---|---|---|---|
| No. of configured CC (a) | No. of CW for each CC | Size of bundling window (b) [subframe] | (a) * (b) | Full multiplexing | No. of spatial bundling CCs | Full multiplexing with spatial bundling |
| 5 | 1/1/1/1/1 | 2 | 10 | 2 + 2 + 2 + 2 + 2 = 10 | 0 | |
| | | 3 | 15 | 3 + 3 + 3 + 3 + 3 = 15 | 0 | |
| | | 4 | 20 | 4 + 4 + 4 + 4 + 4 = 20 | 0 | |
| | | 9 | 45 | 9 + 9 + 9 + 9 + 9 | | |
| | 2/1/1/1/1 | 2 | 10 | 4 + 2 + 2 + 2 + 2 = 12 | 0 | |
| | | 3 | 15 | 6 + 3 + 3 + 3 + 3 = 18 | 0 | |
| | | 4 | 20 | 8 + 4 + 4 + 4 + 4 = 24 | 1 | 4 + 4 + 4 + 4 + 4 = 20 |
| | | 9 | 45 | 18 + 9 + 9 + 9 + 9 | | |
| | 2/2/1/1/1 | 2 | 10 | 4 + 4 + 2 + 2 + 2 = 14 | 0 | |
| | | 3 | 15 | 6 + 6 + 3 + 3 + 3 = 21 | 1 | 6 + 3 + 3 + 3 + 3 = 18 |
| | | 4 | 20 | 8 + 8 + 4 + 4 + 4 = 28 | 2 | 4 + 4 + 4 + 4 + 4 = 20 |
| | | 9 | 45 | 18 + 18 + 9 + 9 + 9 | | |
| | 2/2/2/1/1 | 2 | 10 | 4 + 4 + 4 + 2 + 2 = 16 | 0 | |
| | | 3 | 15 | 6 + 6 + 6 + 3 + 3 = 24 | 2 | 6 + 3 + 3 + 3 + 3 = 18 |
| | | 4 | 20 | 8 + 8 + 8 + 4 + 4 = 32 | 3 | 4 + 4 + 4 + 4 + 4 = 20 |
| | | 9 | 45 | 18 + 18 + 18 + 9 + 9 | | |
| | 2/2/2/2/1 | 2 | 10 | 4 + 4 + 4 + 4 + 2 = 18 | 0 | |
| | | 3 | 15 | 6 + 6 + 6 + 6 + 3 = 27 | 3 | 6 + 3 + 3 + 3 + 3 = 18 |
| | | 4 | 20 | 8 + 8 + 8 + 8 + 4 = 36 | 4 | 4 + 4 + 4 + 4 + 4 = 20 |
| | | 9 | 45 | 18 + 18 + 18 + 9 + 9 | | |
| | 2/2/2/2/2 | 2 | 10 | 4 + 4 + 4 + 4 + 4 = 20 | 0 | |
| | | 3 | 15 | 6 + 6 + 6 + 6 + 6 = 30 | 4 | 6 + 3 + 3 + 3 + 3 = 18 |
| | | 4 | 20 | 8 + 8 + 8 + 8 + 8 = 40 | 5 | 4 + 4 + 4 + 4 + 4 = 20 |
| | | 9 | 45 | 18 + 18 + 18 + 18 + 18 | | | is established. In other words, although the spatial bundling is performed to a total of 5 CCs, the spatial bundling is actually performed only to a CC having 2 CWs. Therefore, Case 1 may also indicate that the spatial bundling is established in all CCs.

Case 2—In Case 2, from among five configured CCs, the number of CCs, each of which has 2 CWs at maximum, is set to 2, and the number CCs, each of which has one CW at maximum, is set to 3. In the case where the bundling window size is set to 3 and the full multiplexing is supported, the spatial bundling for all PDCCHs/PDSCHs can be performed in one CC from among 2 CCs each having 2 CWs. For example, the spatial bundling may be carried out in the last 2 CCs (for example, 1 SCell) from among 2 CCs each having 2 CWs.

Case 3—In Case 3, from among five configured CCs, the number of CCs, each of which has 2 CWs at maximum, is set to 2, and the number CCs, each of which has one CW at maximum, is set to 3. In the case where the bundling window size is set to 4 and the full multiplexing is supported, the spatial bundling for all PDCCHs/PDSCHs can be performed in two CCs from among 2 CCs each having 2 CWs.

Case 4—In Case 4, from among five configured CCs, the number of CCs, each of which has 2 CWs at maximum, is set to 3, and the number CCs, each of which has one CW at maximum, is set to 2. In the case where the bundling window size is set to 3 and the full multiplexing is supported, the spatial bundling for all PDCCHs/PDSCHs may be performed in two CCs from among 3 CCs each having 2 CWs. For example, the spatial bundling may be carried out in the last two CCs (for example, 2 SCells) from among 3 CCs each having 2 CWs.

Case 5—In Case 5, from among five configured CCs, the number of CCs, each of which has 2 CWs at maximum, is set to 3, and the number CCs, each of which has one CW at maximum, is set to 2. In the case where the bundling window size is set to 4 and the full multiplexing is supported, the spatial bundling for all PDCCHs/PDSCHs may be performed in all of 3 CCs each having 2 CWs as necessary.

Case 6—In Case 6, from among five configured CCs, the number of CCs, each of which has 2 CWs at maximum, is set to 4, and the number CCs, each of which has one CW at maximum, is set to 1. In the case where the bundling window size is set to 3 and the full multiplexing is supported, the spatial bundling for all PDCCHs/PDSCHs may be performed in 3 CCs from among 4 CCs each having 2 CWs as necessary. For example, the spatial bundling may be carried out in the last three CCs (for example, 3 SCells) from among 4 CCs each having 2 CWs.

Case 7—In Case 7, from among five configured CCs, the number of CCs, each of which has 2 CWs at maximum, is set to 4, and the number CCs, each of which has one CW at maximum, is set to 1. In the case where the bundling window size is set to 4 and the full multiplexing is supported, the spatial bundling for all PDCCHs/PDSCHs may be performed in all the 4 CCs each having 2 CWs as necessary.

Case 8—In Case 8, from among five configured CCs, the number of CCs, each of which has 2 CWs at maximum, is set to 2, and the number CCs, each of which has one CW at maximum, is set to 5. In the case where the bundling window size is set to 3 and the full multiplexing is supported, the spatial bundling for all PDCCHs/PDSCHs may be performed in 4 CCs from among 5 CCs each having 2 CWs as necessary. For example, the spatial bundling may be carried out in the last four CCs (for example, 4 SCells) from among 5 CCs each having 2 CWs.

Case 9—In Case 9, five configured CCs are composed of 5 CCs each having 2 CWs at maximum. In the case where the bundling window size is set to 4 and the full multiplexing is supported, the spatial bundling for all PDCCHs/PDSCHs can be performed in 5 CCs.

Therefore, if the number of configured CCs is set to 5, the spatial bundling can be carried out using the following equation 8.

If $N_{configured\ CCs}=5$ and $N_{bundling\ windows}=9$,

No full multiplexing

If $N_{configured\ CCs}=5$ and $N_{total\ A/N}(=N_{total\ CWs} \cdot N_{bundling\ windos})>20$, [Equation 8]

spatial bundling for only the last n (logical indexed) CCs among 2 CWs CCs
  where, n may have different value according to $N_{configured\ CCs}$ and $N_{bundling\ windows}$
or
spatial bundling for $(N_{bundling\ windos}-3)+(N_{total\ CWs}-6)$ CC(s) from the last (logical indexed) CC
  (=spatial bundling for $N_{bundling\ windos}+N_{total\ CWs}-9$ CC(s) from the last (logincal indexed) CC)

In Embodiment 1-4, the spatial bundling condition of 5 configured CCs may be applied irrespective of the number of configured CCs. In other words, Equation (e.g., $N_{bundling\ windos}+N_{total\ CWs}-9$) of the number of CCs to which the spatial bundling of 5 configured CCs is applied can be applied to Embodiments 1-1 to 1-3 so as to achieve the same result, and may correspond to any one of two cases each having two CCs to which the spatial bundling is to be applied. Therefore, the number of CCs in which the spatial bundling is performed in ACK/NACK full multiplexing using one conditional statement in such a manner that the system can be more simplified and be commonly applied to Embodiment 1.

In the case of using the CC-wise spatial bundling, the following equations 9 and 10 can be used as conditional statements that control the spatial bundling at the ACK/NACK full multiplexing through one conditional statement irrespective of the number of configured CCs.

If $N_{bundling\ windows} = 9$, [Equation 9]
No full multiplexing
  (optionally, full multiplexing with spatial bundling
    is applied only for $N_{configured\ CCs} = 2$)
Else if $N_{total\ A/N}( = N_{total\ CWs} \cdot N_{bundling\ windos}) =$
$$\sum_{i=0}^{N_{configured\ CC}-1} N_{max.no\ of\ CW\ for\ i-th\ CC} \cdot N_{bundling\ windos} > 20,$$
Spatial multiplexing is applied
  for $(N_{bundling\ windos} + N_{total\ CWs} - 9)$ $CC(s)$ which is
  configured by 2 $CWs$ according to a predetermined
    rule (e.g. starting from the last logical indexed $CC$)
    Else
    Full multiplexing without spatial bundling -continued If $N_{bundling\ windows} = 9$, [Equation 10]

If $N_{configured\ CCs} = 2$,

Spatial bundling for all
    CCs ( // all CCs means all CCs
        which is configured by 2 CWs)
Else
    No full multiplexing
Else if $N_{total\ A/N}\ (= N_{total\ CWs} \cdot N_{bundling\ windos}) =$ $$\sum_{i=0}^{N_{configured\ CC}-1} N_{max.no\ of\ CW\ for\ i-th\ CC} \cdot N_{bundling\ windos} > 20,$$

Spatial multiplexing is applied
    for $(N_{bundling\ windos} + N_{total\ CWs} - 9)\ CC(s)$ which is
    configured by 2 CWs according to a predetermined
    rule (e.g. starting from the last logical indexed CC)
    Else
        Full multiplexing without spatial bundling As described in Embodiments 1-1 to 1-4, information as to whether the ACK/NACK full multiplexing/spatial bundling is to be carried out at a carrier level is determined at once, such that the full multiplexing/spatial bundling for setting the ACK/NACK payload size to X or less (e.g., X=20) without repetition operations can be carried out.

Figure 13:
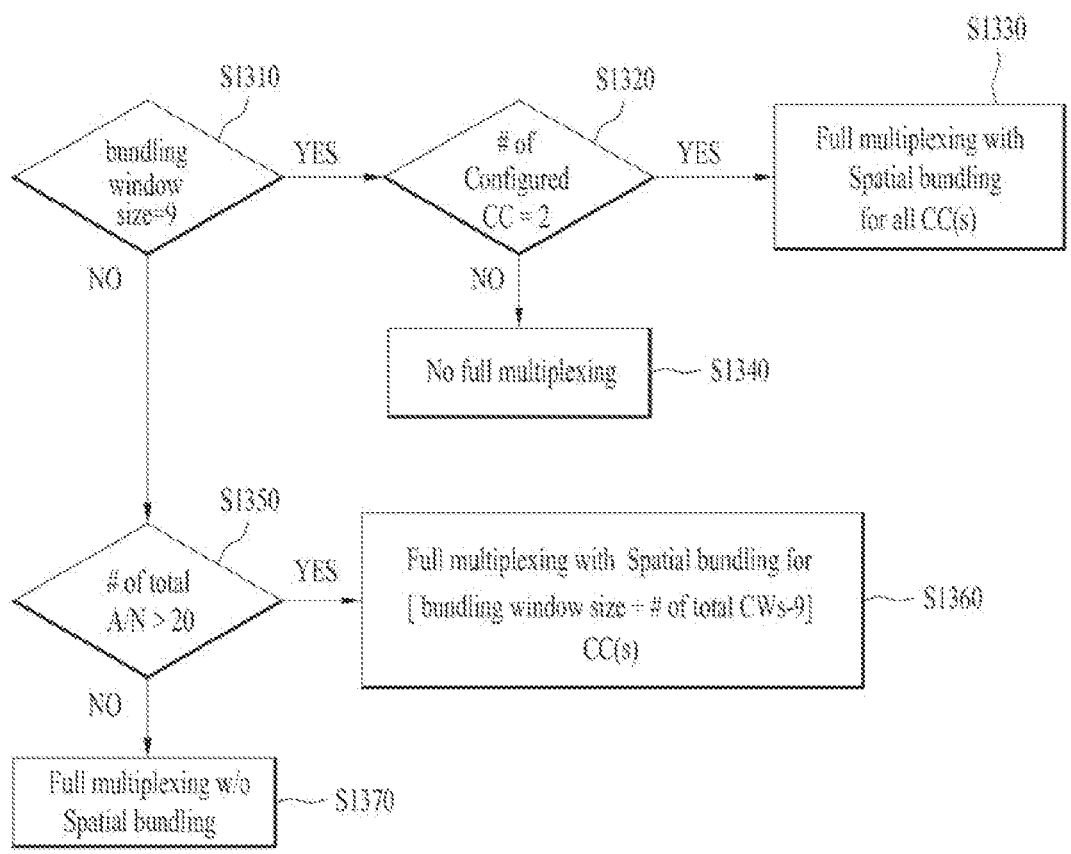
FIG. 13 shows another example of carrier level spatial multiplexing.

FIG. 13 shows another example for determining the application or non-application of carrier level spatial multiplexing. In accordance with the example of FIG. 13, in the case where the channel structure (or PUCCH format) for supporting the ACK/NACK payload size X (e.g., X=20) is used in a TDD system, the application or non-application of ACK/NACK full multiplexing and information as to which one of carriers is to be spatially bundled can be determined.

In step S1310, it is determined whether the bundling window size is set to 9. The bundling window size of 9 means that ACK/NACK transmission for 9 DL subframes is established in one UL subframe (i.e., 9 DL:1 UL). Only in the case where the bundling window size is set to 9 and the number of UE-configured CCs is set to 2 at step S1320, the spatial bundling can be applied to each CC having two or more CWs at step S1330. In step S1330, although the spatial bundling is applied to all CCs, the same result can be obtained. On the other hand, in the case where the bundling window size is set to 9 and the number of UE-configured CCs is set to 3 or higher, the full multiplexing is not applied irrespective of the application or non-application at step S1340, because the ACK/NACK channel structure exceeds X bits although the spatial bundling is applied.

In the case where the bundling window size is set to 9 or others (this means that the bundling window size of the LTE system is set to 2, 3 or 4), it is determined whether the sum of individual ACK/NACK bits exceeds X bits (where X=20) at step S1350. If the sum of individual ACK/NACK bits does not exceed X bits at step S1350, the ACK/NACK full multiplexing can be applied without the execution of spatial bundling at step S1370. On the other hand, if the sum of individual ACK/NACK bits exceeds X bits at step S1350, the spatial bundling can be applied to one or more CCs determined by the pre-defined rule from among the UE-configured CCs at step S1360. In the case where the number of CCs to which the spatial bundling is to be applied is set to 20 (X=20), [Bundling Window Size+Total Number of CWs in one DL subframe−9] may be determined, and the principles for deriving the above-mentioned rule have already been disclosed in Embodiments 1-1 to 1-4. Predetermined numbers of CCs can be sequentially selected in ascending (or descending) numerical order of CC indexes, and the spatial bundling is performed in the selected CCs. In this case, the index positions (o frequency positions) of selected carriers are disclosed only for illustrative purposes, and arbitrary CCs may be selected from among a plurality of CCs.

In this way, the spatial bundling is applied to one or more CCs on the basis of the ACK/NACK full multiplexing, such that a maximum number (X) of bits supported by the ACK/NACK channel structure can be maximally used, an original state of individual ACK/NACK information is maximally maintained, the spatial bundling is applied to a carrier level, and ACK/NACK information can be efficiently transmitted.

Embodiment 2

Embodiment 2 shows a method for performing the spatial bundling at a specific subframe (at a subframe level). The spatial bundling at the subframe level means that the spatial bundling is performed at all CCs of a specific subframe.

In the following description, a maximally supportable payload size (or a predetermined payload size) in a specific channel structure (or PUCCH format) for ACK/NACK transmission is denoted by X (for example, X=20).

If the size of ACK/NACK payload to be transmitted is larger than X, the spatial bundling is performed in specific subframes according to the predetermined rule, such that the transmission payload can be smaller than X or less. In order to generate transmission payload of X or less according to the simple rule, the present invention proposes the rule for applying the subframe level spatial bundling. That is, if the original ACK/NACK payload size is larger than X or higher, the spatial bundling is performed in a predetermined number of subframes and ACK/NACK information can be generated and transmitted without using the spatial bundling in the remaining CCs.

Figure 14:
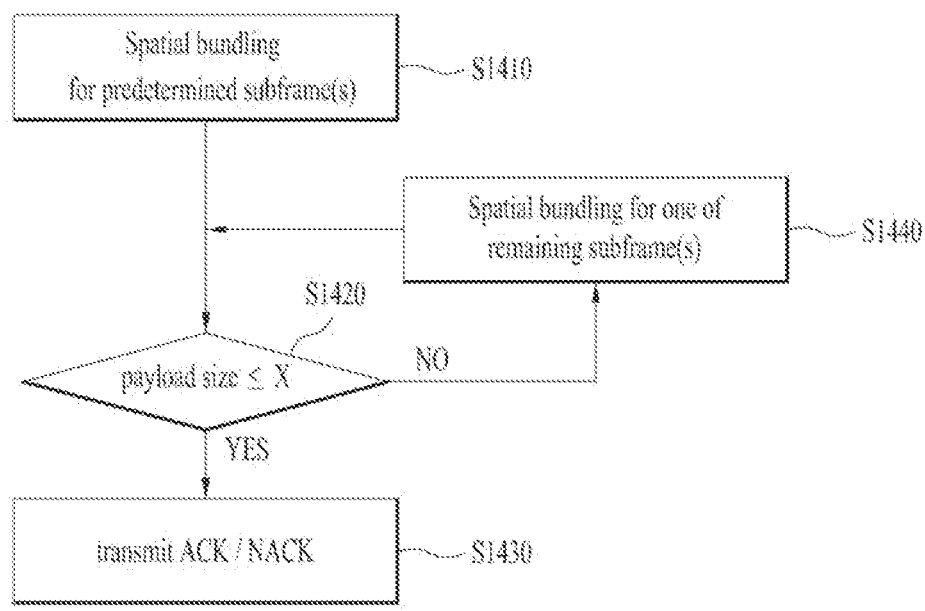
FIG. 14 shows an example of subframe level spatial multiplexing.

FIG. 14 shows an example for applying the spatial multiplexing in units of a subframe.

Referring to FIG. 14, the spatial bundling is performed on ACK/NACK information in association with transmission of some CCs contained in the bundling window at step S1410. Some CCs may be determined according to the predetermined rule.

For example, according to the predetermined rule, subframe(s) including transmission of 2 CWs (or transmission of a maximum of 2 CWs is configured/established) from among all subframes contained in the bundling window may be determined, and N subframes (where N≥1) from among the corresponding subframes may be determined in descending (or ascending) numerical order of subframe indexes. However, the above-mentioned rules are disclosed only for illustrative purposes, and an arbitrary rule for selecting some subframes from among all subframes can be used.

In step S1420, it is determined whether the size of all ACK/NACK payload contained in the bundling window is identical to or less than X according to the result of spatial bundling of the step S1410. If the size of ACK/NACK payload is identical to or less than X, the step S1430 is performed. If the size of ACK/NACK payload is higher than X, the step S1440 is performed.

In step S1430, if the size of the resultant ACK/NACK payload obtained by the spatial bundling is identical to or less than X, ACK/NACK information is transmitted using the corresponding ACK/NACK channel (or PUCCH format).

In step S1440, if the size of ACK/NACK payload is still larger than X, the spatial bundling is additionally performed to one of the remaining subframes to which no spatial bundling has been applied in the previous operation. Deciding any one of subframe from among the remaining subframes may be dependent upon the predetermined rule. The predetermined rule may determine one subframe from among the remaining subframes contained in the bundling window according to the descending (or ascending) numerical order of subframe indexes. However, the above-mentioned rule is disclosed only for illustrative purposes, and an arbitrary rule for determining one of the remaining subframes may be applied as necessary.

Therefore, the spatial bundling may be repeatedly applied in units of a subframe until the size of ACK/NACK payload is reduced to X or less, and the ACK/NACK information having a payload size of X or less can be transmitted.

On the other hand, instead of using the above-mentioned sequential repetition operation, information as to whether the spatial bundling is performed in a predetermined number of subframes is determined at once by an equation, such that the spatial bundling for adjusting the ACK/NACK payload size to be X or less without any repetition operation can be carried out. Detailed examples of the present invention will be described in detail. In the following description, the possibility of applying ACK/NACK full multiplexing to 2 configured CCs, 3 configured CCs, 4 configured CCs or 5 configured CCs and the rule of applying the spatial bundling of a subframe level will hereinafter be described.

Embodiment 2-1

In the case where 2 CCs are configured in the UE, the spatial bundling can be applied to specific subframes not to exceed the predefined payload size X, as shown in the following table 10. In Table 10, X is set to 20 (X=20), and it is assumed that a maximum number of CWs in each CC is set to 2. In the case where the bundling window size is set to 2, 3, 4, or 9, the number of bits required for ACK/NACK transmission is shown in Table 10.

TABLE 10

| No. of configured CC (a) | No. of CW for each CC | Size of bundling window (b) [subframe] | (a) * (b) | Size of A/N payload [state] Full multiplexing | No. of spatial bundling subframes | Full multiplexing with spatial bundling |
|---|---|---|---|---|---|---|
| 2 | 1/1 | 2 | 4 | 2 * 2 = 4 | 0 | |
|  |  | 3 | 6 | 2 * 3 = 6 | 0 | |
|  |  | 4 | 8 | 2 * 4 = 8 | 0 | |
|  |  | 9 | 18 | 2 * 9 = 18 | 0 | |
|  | 2/1 | 2 | 4 | 3 * 2 = 6 | 0 | |
|  |  | 3 | 6 | 3 * 3 = 9 | 0 | |
|  |  | 4 | 8 | 3 * 4 = 12 | 0 | |
|  |  | 9 | 18 | 3 * 9 = 27 | 1 | 2 * 9 |
|  | 1/2 | 2 | 4 | 3 * 2 = 6 | 0 | |
|  |  | 3 | 6 | 3 * 3 = 9 | 0 | |
|  |  | 4 | 8 | 3 * 4 = 12 | 0 | |
|  |  | 9 | 18 | 3 * 9 = 27 | 1 | 2 * 9 |
|  | 2/2 | 2 | 4 | 4 * 2 = 8 | 0 | |
|  |  | 3 | 6 | 4 * 3 = 12 | 0 | |
|  |  | 4 | 8 | 4 * 4 = 16 | 0 | |
|  |  | 9 | 18 | 4 * 9 = 36 | 2 | 2 * 9 |

In Table 10, 'Size of A/N payload' means the combination of bits for each subframe, namely, a total number of transmission bits. For example, in the case where the number of CWs for each CC is set to 1 (No. of CW for each CC=1/1) and the size of bundling window is set to 2, 2 bits is required for each CC when full multiplexing is applied, and if bit numbers for 2 subframes are summed, payload of 4 bits (2+2=4) is needed.

In the case where 2 CCs are configured as shown in Table 10 and the full multiplexing is applied to three cases from among 16 cases, the number of ACK/NACK bits to be transmitted may unexpectedly exceed 20 bits. The above-mentioned three cases disclose that the size of bundling window is set to 0 at rare intervals.

In the case where the number of configured CCs is set to 2 and any one of two CCs has 2 CWs or less and the bundling window size is set to 9, it is impossible to use the full multiplexing (pure full multiplexing to which no spatial bundling is applied). In this case, the ACK/NACK payload to be transmitted needs to be set to 20 bits or less using the spatial bundling. For this purpose, according to the above-mentioned three cases, it is necessary to perform the spatial bundling for all PDCCHs/PDSCHs in all subframes and all CCs contained in the bundling window. In accordance with the present embodiment, since the spatial bundling is performed in 2 CWs, the spatial bundling is not actually performed even in the case where the number of CWs belonging to a specific carrier or specific subframe is set to 1. That is, the spatial bundling application is defined irrespective of the number of CWs in such a manner that the spatial bundling application can be simply defined. If the number of CWs is set to 2, the spatial bundling is applied. If the number of CWs is set to 1, the spatial bundling is not applied.

On the other hand, provided that the number of configured CCs is set to 2, the full multiplexing can be applied without the execution of spatial bundling when the bundling window size is set to 9 or others (for example, if the bundling window size is set to 2, 3 or 4).

Therefore, provided that the number of configured CCs is set to 2 irrespective of the number of CWs, the spatial bundling can be performed using the following equation 11.

If $N_{configured\ CCs}=2$ and $N_{bundling\ windows}=9$, [Equation 11]

spatial bundling for all PDCCHs/PDSCHs (CCs and subframes)

Embodiment 2-2

In the case where three CCs are configured in the UE, the spatial bundling can be applied to specific subframes not to exceed the predefined payload size X, as shown in the following table 11. In Table 11, X is set to 20 (X=20), and it is assumed that a maximum number of CWs in each CC is set to 2. In the case where the bundling window size is set to 2, 3, 4, or 9, the number of bits required for ACK/NACK transmission is shown in Table 11.

required for each subframe. If the numbers of bits of 2 subframes are summed, payload of 6 bits (3×2=6) is needed.

As can be seen from Table 11, if 3 CCs are configured and the bundling window size is set to 9, it is impossible to support the full multiplexing irrespective of the application or non-application of the spatial bundling. That is, although the spatial bundling is applied, payload composed of a total of 27 bits exceeding the payload size of 20 bits is needed.

Except for the case in which the bundling window size is set to 9, the ACK/NACK payload exceeds 20 bits in only one case. In this case, the spatial bundling may be carried out according to the predetermined rule.

According to the predetermined rule, provided that 3 CCs are configured, if a maximum number of CWs in all CCs is set to 2 and the bundling window size is set to 4, the spatial bundling may be performed in all PDCCHs/PDSCHs of two subframes. For example, from among 4 subframes, subframes to which the spatial bundling is applied may be 2 high-indexed subframes (i.e., 2 rear subframes on the basis of a time axis). Alternatively, 2 subframes to which the spatial bundling is applied may be two low-indexed subframes (i.e., 2 front subframes on the basis of a time axis). Alternatively, the spatial bundling may be applied to two subframes (e.g., odd-th or even-th subframe) determined by the predetermined rule from among 4 subframes.

TABLE 11

| No. of configured CC (a) | No. of CW for each CC | Size of bundling window (b) [subframe] | Size of A/N payload [state] | | No. of spatial bundling subframes | Full multiplexing with spatial bundling |
|---|---|---|---|---|---|---|
| | | | (a) * (b) | Full multiplexing | | |
| 3 | 1/1/1 | 2 | 6 | 3 * 2 = 6 | 0 | |
| | | 3 | 9 | 3 * 3 = 9 | 0 | |
| | | 4 | 12 | 3 * 4 = 12 | 0 | |
| | | 9 | 27 | 3 * 9 = 27 | | |
| | 2/1/1 | 2 | 6 | 4 * 2 = 8 | 0 | |
| | | 3 | 9 | 4 * 3 = 12 | 0 | |
| | | 4 | 12 | 4 * 4 = 16 | 0 | |
| | | 9 | 27 | 4 * 9 = 36 | | |
| | 2/2/1 | 2 | 6 | 5 * 2 = 10 | 0 | |
| | | 3 | 9 | 5 * 3 = 15 | 0 | |
| | | 4 | 12 | 5 * 4 = 20 | 0 | |
| | | 9 | 27 | 5 * 9 = 45 | | |
| | 2/2/2 | 2 | 6 | 6 * 2 = 12 | 0 | |
| | | 3 | 9 | 6 * 3 = 18 | 0 | |
| | | 4 | 12 | 6 * 4 = 24 | 2 | 6 * 2 + 3 * 2 = 18 |
| | | 9 | 27 | 6 * 9 = 54 | | |

In Table 11, the same or overlapped contents related to the combinations of maximum numbers of CWs for each CC are omitted for convenience of description, and only specific cases having different total sum values of CW numbers from among the combinations are exemplarily disclosed for illustrative purposes. For example, the case that the number of CWs for each CC is 1/2/1 or 1/1/2 can be substantially identical to the other case of 2/1/1 shown in Table 11, as such a detailed description thereof will herein be omitted for convenience of description.

As can be seen from Table 11, for example, if the full multiplexing is applied to the case in which the number of CWs for each CC is set to 1 (i.e., No. of CW for each CC=1/1/1) and the bundling window size is set to 2, 3 bits are Therefore, if the number of configured CCs is set to 3, the spatial bundling can be carried out using the following equation 12.

If $N_{configured\ CCs}=3$ and $N_{bundling\ windows}=9$,

No full multiplexing

If $N_{configured\ CCs}=3$ and ($N_{total\ A/N}=N_{total\ CWs} \cdot N_{bundling\ windos}>20$) [Equation 12]

spatial bundling only for last two subframes

Embodiment 2-3

In the case where four CCs are configured in the UE, the spatial bundling can be applied to specific subframes not to exceed the predefined payload size X, as shown in the following table 12. In Table 12, X is set to 20 (X=20), and it is assumed that a maximum number of CWs in each CC is set to 2. In the case where the bundling window size is set to 2, 3, 4, or 9, the number of bits required for ACK/NACK transmission is shown in Table 12.

TABLE 12

| No. of configured CC (a) | No. of CW for each CC | Size of bundling window (b) [subframe] | (a) * (b) | Size of A/N payload [state] Full multiplexing | No. of spatial bundling subframes | Full multiplexing with spatial bundling |
|---|---|---|---|---|---|---|
| 4 | 1/1/1/1 | 2 | 8 | 4 * 2 = 8 | 0 | |
|   |   | 3 | 12 | 4 * 3 = 12 | 0 | |
|   |   | 4 | 16 | 4 * 4 = 16 | 0 | |
|   |   | 9 | 36 | 4 * 9 = 36 | | |
|   | 2/1/1/1 | 2 | 8 | 5 * 2 = 10 | 0 | |
|   |   | 3 | 12 | 5 * 3 = 15 | 0 | |
|   |   | 4 | 16 | 5 * 4 = 20 | 0 | |
|   |   | 9 | 36 | 5 * 9 = 45 | | |
|   | 2/2/1/1 | 2 | 8 | 6 * 2 = 12 | 0 | |
|   |   | 3 | 12 | 6 * 3 = 18 | 0 | |
|   |   | 4 | 16 | 6 * 4 = 24 | 2 | 6 * 2 + 4 * 2 = 20 |
|   |   | 9 | 36 | 6 * 9 = 54 | | |
|   | 2/2/2/1 | 2 | 8 | 7 * 2 = 14 | 0 | |
|   |   | 3 | 12 | 7 * 3 = 21 | 1 | 7 * 2 + 4 * 1 = 18 |
|   |   | 4 | 16 | 7 * 4 = 28 | 3 | 7 * 1 + 4 * 3 = 19 |
|   |   | 9 | 36 | 7 * 9 = 63 | | |
|   | 2/2/2/2 | 2 | 8 | 8 * 2 = 16 | 0 | |
|   |   | 3 | 12 | 8 * 3 = 24 | 1 | 8 * 2 + 4 * 1 = 20 |
|   |   | 4 | 16 | 8 * 4 = 32 | 3 | 8 * 1 + 4 * 3 = 20 |
|   |   | 9 | 36 | 8 * 9 = 72 | | |

In Table 12, the same or overlapped contents related to the combinations of maximum numbers of CWs for each CC are omitted for convenience of description, and only specific cases having different total sum values of CW numbers from among the combinations are exemplarily disclosed for illustrative purposes. For example, the case that the number of CWs for each CC is 1/1/1/2, 1/1/2/1 or 1/2/1/1 can be substantially identical to the other case of 2/1/1/1 shown in Table 12, as such a detailed description thereof will herein be omitted for convenience of description.

As can be seen from Table 12, for example, if the full multiplexing is applied to the case in which the number of CWs for each CC is set to 1 (i.e., No. of CW for each CC=1/1/1/1) and the bundling window size is set to 2, 4 bits are required for each subframe. If the numbers of bits of 2 subframes are summed, payload of 8 bits (4×2=8) is needed.

As can be seen from Table 12, if 4 CCs are configured and the bundling window size is set to 9, it is impossible to support the full multiplexing irrespective of the application or non-application of the spatial bundling. That is, although the spatial bundling is applied, payload composed of a total of 36 bits exceeding the payload size of 20 bits is needed.

Except for the case in which the bundling window size is set to 9, the ACK/NACK payload exceeds 20 bits in five cases. A method for performing the spatial bundling to each of the above-mentioned five cases (Case 1 to Case 5) will hereinafter be described in detail.

Case 1—In Case 1, from among four configured CCs, the number of CCs, each of which has 2 CWs at maximum, is set to 2, and the number CCs, each of which has one CW at maximum, is set to 2. In the case where the bundling window size is set to 4 and the full multiplexing is supported, the spatial bundling for all PDCCHs/PDSCHs can always be performed in two subframes from among 4 subframes. For example, the spatial bundling can be performed in the last two subframes (or the first two subframes) from among 4 subframes. Alternatively, the spatial bundling may also be performed in the odd-th or even-th subframe from among four subframes as necessary.

Case 2—In Case 2, from among four configured CCs, the number of CCs, each of which has 2 CWs at maximum, is set to 3, and the number CCs, each of which has one CW at maximum, is set to 1. In the case where the bundling window size is set to 3 and the full multiplexing is supported, the spatial bundling for all PDCCHs/PDSCHs can always be performed in one of three subframes. For example, the spatial bundling can be performed in the last one subframe (or the first one subframe) from among 3 subframes.

Case 3—In Case 3, from among four configured CCs, the number of CCs, each of which has 2 CWs at maximum, is set to 3, and the number CCs, each of which has one CW at maximum, is set to 1. In the case where the bundling window size is set to 4 and the full multiplexing is supported, the spatial bundling for all PDCCHs/PDSCHs can always be performed in three subframes. For example, the spatial bundling can be performed in the last one subframe (or the first one subframe) from among 4 subframes.

Case 4—In Case 4, four configured CCs are composed of 4 CCs each having 2 CWs at maximum. In the case where the bundling window size is set to 3 and the full multiplexing is supported, the spatial bundling for all PDCCHs/PDSCHs can always be performed in one of three subframes. For example, the spatial bundling can be performed in the last one subframe (or the first one subframe) from among 3 subframes.

Case 5—In Case 5, four configured CCs are composed of 4 CCs each having 2 CWs at maximum. In the case where the bundling window size is set to 4 and the full multiplexing is supported, the spatial bundling for all PDCCHs/PDSCHs may be performed in three CCs from among four CCs. For example, the spatial bundling can be performed in the last one subframe (or the first one subframe) from among 4 subframes.

Therefore, if the number of configured CCs is set to 4, the spatial bundling can be carried out using the following equation 13.

If $N_{configured\ CCs}=4$ and $N_{bundling\ windows}=9$,

No full multiplexing

If $N_{configured\ CCs}=4$ and $N_{total\ A/N}(=N_{total\ CWs} \cdot N_{bundling\ windos}) > 20$, [Equation 13]

spatial bundling only for the last $2 \cdot (N_{bundling\ windos} \cdot 3) + \lfloor (N_{total\ CWs}+1)/2 \rfloor - 3$ subframes (=spatial bundling only for the last $2 \cdot N_{bundling\ windos} + \lfloor (N_{total\ CWs}+1)/2 \rfloor - 9$ subframes)

In Equation 13, $\lfloor \cdot \rfloor$ means a floor operation.

Embodiment 2-4

In the case where five CCs are configured in the UE, the spatial bundling can be applied to specific subframes not to exceed the predefined payload size X, as shown in the following table 13. In Table 13, X is set to 20 (X=20), and it is assumed that a maximum number of CWs in each CC is set to 2. In the case where the bundling window size is set to 2, 3, 4, or 9, the number of bits required for ACK/NACK transmission is shown in Table 13.

CWs for each CC is set to 1 (i.e., No. of CW for each CC=1/1/1/1/1) and the bundling window size is set to 2, 5 bits are required for each subframe. If the numbers of bits of 2 CCs are summed, payload of 10 bits (5×2=10) is needed.

As can be seen from Table 13, if 5 CCs are configured and the bundling window size is set to 9, it is impossible to support the full multiplexing irrespective of the application or non-application of the spatial bundling. That is, although the spatial bundling is applied, payload composed of a total of 45 bits exceeding the payload size of 20 bits is needed.

Except for the case in which the bundling window size is set to 9, the ACK/NACK payload exceeds 20 bits in 9 cases. A method for performing the spatial bundling to each of the above-mentioned nine cases (Case 1 to Case 9) will hereinafter be described in detail.

Case 1—In Case 1, from among five configured CCs, the number of CCs, each of which has 2 CWs at maximum, is set to 1, and the number CCs, each of which has one CW at maximum, is set to 4. In the case where the bundling window size is set to 4 and the full multiplexing is supported, the spatial bundling for all PDCCHs/PDSCHs can be performed in all the four subframes.

Case 2—In Case 2, from among five configured CCs, the number of CCs, each of which has 2 CWs at maximum, is set to 2, and the number CCs, each of which has one CW at

TABLE 13

| No. of configured CC (a) | No. of CW for each CC | Size of bundling window (b) [subframe] | (a) * (b) | Full multiplexing | No. of spatial bundling subframes | Full multiplexing with spatial bundling |
|---|---|---|---|---|---|---|
| 5 | 1/1/1/1/1 | 2 | 10 | 5 * 2 = 10 | 0 | |
| | | 3 | 15 | 5 * 3 = 15 | 0 | |
| | | 4 | 20 | 5 * 4 = 20 | 0 | |
| | | 9 | 45 | 5 * 9 = 45 | | |
| | 2/1/1/1/1 | 2 | 10 | 6 * 2 = 12 | 0 | |
| | | 3 | 15 | 6 * 3 = 18 | 0 | |
| | | 4 | 20 | 6 * 4 = 24 | 4 | 5 * 4 = 20 |
| | | 9 | 45 | 6 * 9 = 54 | | |
| | 2/2/1/1/1 | 2 | 10 | 7 * 2 = 14 | 0 | |
| | | 3 | 15 | 7 * 3 = 21 | 1 | 7 * 2 + 5 * 1 = 19 |
| | | 4 | 20 | 7 * 4 = 28 | 4 | 5 * 4 = 20 |
| | | 9 | 45 | 7 * 9 = 63 | | |
| | 2/2/2/1/1 | 2 | 10 | 8 * 2 = 16 | 0 | |
| | | 3 | 15 | 8 * 3 = 24 | 2 | 8 * 1 + 5 * 2 = 18 |
| | | 4 | 20 | 8 * 4 = 32 | 4 | 5 * 4 = 20 |
| | | 9 | 45 | 8 * 9 = 72 | | |
| | 2/2/2/2/1 | 2 | 10 | 9 * 2 = 18 | 0 | |
| | | 3 | 15 | 9 * 3 = 27 | 2 | 9 * 1 + 5 * 2 = 19 |
| | | 4 | 20 | 9 * 4 = 36 | 4 | 5 * 4 = 20 |
| | | 9 | 45 | 9 * 9 = 81 | | |
| | 2/2/2/2/2 | 2 | 10 | 10 * 2 = 20 | 0 | |
| | | 3 | 15 | 10 * 3 = 30 | 2 | 10 * 1 + 5 * 2 = 20 |
| | | 4 | 20 | 10 * 4 = 40 | 4 | 5 * 4 = 20 |
| | | 9 | 45 | 10 * 9 = 90 | | |

In Table 13, the same or overlapped contents related to the combinations of maximum numbers of CWs for each CC are omitted for convenience of description, and only specific cases having different total sum values of CW numbers from among the combinations are exemplarily disclosed for illustrative purposes. For example, the case that the number of CWs for each CC is 1/1/1/1/2, 1/1/1/2/1, 1/1/2/1/1 or 1/2/1/1/1 can be substantially identical to the other case of 2/1/1/1/1 shown in Table 13, as such a detailed description thereof will herein be omitted for convenience of description.

As can be seen from Table 13, for example, if the full multiplexing is applied to the case in which the number of maximum, is set to 3. In the case where the bundling window size is set to 3 and the full multiplexing is supported, the spatial bundling for all PDCCHs/PDSCHs can be performed in one of three subframes. For example, the spatial bundling may be carried out in the last one subframe (or the first one subframe) from among three subframes.

Case 3—In Case 3, from among five configured CCs, the number of CCs, each of which has 2 CWs at maximum, is set to 2, and the number CCs, each of which has one CW at maximum, is set to 3. In the case where the bundling window size is set to 4 and the full multiplexing is supported, the spatial bundling for all PDCCHs/PDSCHs can be performed in all the four subframes.

Case 4—In Case 4, from among five configured CCs, the number of CCs, each of which has 2 CWs at maximum, is set to 3, and the number CCs, each of which has one CW at maximum, is set to 2. In the case where the bundling window size is set to 3 and the full multiplexing is supported, the spatial bundling for all PDCCHs/PDSCHs can always be performed in two subframes from among 3 subframes. For example, the spatial bundling may be carried out in the last two subframes (or the first two subframes) from among three subframes.

Case 5—In Case 5, from among five configured CCs, the number of CCs, each of which has 2 CWs at maximum, is set to 3, and the number CCs, each of which has one CW at maximum, is set to 2. In the case where the bundling window size is set to 4 and the full multiplexing is supported, the spatial bundling for all PDCCHs/PDSCHs may be performed in all the four subframes.

Case 6—In Case 6, from among five configured CCs, the number of CCs, each of which has 2 CWs at maximum, is set to 4, and the number CCs, each of which has one CW at maximum, is set to 1. In the case where the bundling window size is set to 3 and the full multiplexing is supported, the spatial bundling for all PDCCHs/PDSCHs can always be performed in 2 subframes from among 3 subframes. For example, the spatial bundling may be carried out in the last two subframes (for example, the first two subframes) from among 3 subframes.

Case 7—In Case 7, from among five configured CCs, the number of CCs, each of which has 2 CWs at maximum, is set to 4, and the number CCs, each of which has one CW at maximum, is set to 1. In the case where the bundling window size is set to 4 and the full multiplexing is supported, the spatial bundling for all PDCCHs/PDSCHs may be performed in all the 4 subframes.

Case 8—In Case 8, from among five configured CCs, the number of CCs, each of which has 2 CWs at maximum, is set to 2, and the number CCs, each of which has one CW at maximum, is set to 5. In the case where the bundling window size is set to 3 and the full multiplexing is supported, the spatial bundling for all PDCCHs/PDSCHs can always be performed in two subframes from among 3 subframes. For example, the spatial bundling may be carried out in the last two subframes (or the first two subframes) from among three subframes.

Case 9—In Case 9, five configured CCs are composed of 5 CCs each having 2 CWs at maximum. In the case where the bundling window size is set to 4 and the full multiplexing is supported, the spatial bundling for all PDCCHs/PDSCHs can be performed in all the four subframes.

Therefore, if the number of configured CCs is set to 5, the spatial bundling can be carried out using the following equation 14.

If $N_{configured\ CCs}=5$ and $N_{bundling\ windows}=9$,

No full multiplexing

If $N_{configured\ CCs}=5$ and $N_{total\ A/N}(=N_{total\ CWs} \cdot N_{bundling\ windos})>20$, [Equation 14]

spatial bundling is applied only for the last $\lfloor (N_{total\ CWs}-4)/4 \rfloor + \lfloor (N_{bundling\ windos}+3)/N_{total\ CWs} \rfloor + 2 \cdot N_{bundling\ windos} - 5 = 2 \cdot N_{bundling\ windos} + \lfloor (N_{total\ CWs}-4)/4 \rfloor + \lfloor (N_{bundling\ windos}+3)/N_{total\ CWs} \rfloor - 5$ subframes A method for applying the spatial bundling of a subframe level in association with the ACK/NACK full multiplexing schemes shown in Embodiments 2-1 to 2-4 can be represented by the following Equations 15 or 16 showing a single conditional statement associated with the number of configured CCs.

If $N_{bundling\ windows}=9$, [Equation 15]

No full multiplexing (optionally, full multiplexing with spatial bundling is applied only for $N_{configured\ CCs}=2$)

Else If $N_{total\ A/N}(=N_{total\ CWs} \cdot N_{bundling\ windos})>20$,

If $N_{configured\ CCs}=5$,
spatial bundling is applied only for $\lfloor (N_{total\ CWs}-4)/4 \rfloor + \lfloor (N_{bundling\ windos}+3)/N_{total\ CWs} \rfloor + 2 \cdot N_{bundling\ windos} - 5 = 2 \cdot N_{bundling\ windos} + \lfloor (N_{total\ CWs}-4)/4 \rfloor + \lfloor (N_{bundling\ windos}+3)/N_{total\ CWs} \rfloor - 5$
subframes according to a predetermined rule (e.g. from the last indexed subframe)

Else ($N_{configured\ CCs}=1,2,3,$ or $4$)

Spatial bundling only for $2 \cdot N_{bundling\ windos} + \lfloor (N_{total\ CWs}+1)/2 \rfloor - 9$ subframes according to a predetermined rule (e.g. from the last indexed subframe)

Else
Full multiplexing without spatial bundling

If $N_{bundling\ windows}=9$,

If $N_{configured\ CCs}=2$, [Equation 16]

Spatial bundling for all subframes (// all subframes (or CCs) means all subframes (CCs) configured by 2 CWs)
Else
No full multiplexing Else if $N_{total\ A/N}(=N_{total\ CWs} \cdot N_{bundling\ windos})>20$, If $N_{configured\ CCs}=5$, Spatial multiplexing is applied only for $\lfloor (N_{total\ CWs}-4)/4 \rfloor + \lfloor (N_{bundling\ windos}+3)/N_{total\ CWs} \rfloor 2 \cdot N_{bundling\ windos} - 5 = 2 \cdot N_{bundling\ windos} + \lfloor (N_{total\ CWs}-4)/4 \rfloor + \lfloor (N_{bundling\ windos}+3)/N_{total\ CWs} \rfloor - 5$ subframes according to a predetermined rule (e.g. from the last indexed subframe)

Else ($N_{configured\ CCs}=1,2,3,$ or $4$)

Spatial bundling only for $2 \cdot N_{bundling\ windos} + \lfloor (N_{total\ CWs}+1)/2 \rfloor - 9$ subframes according to a predetermined rule (e.g. from the last indexed subframe)
Else
Full multiplexing without spatial bundling As described in Embodiments 2-1 to 2-4, information as to whether ACK/NACK full multiplexing and spatial bundling are to be performed at a subframe level is determined at once, such that the full multiplexing and spatial bundling for adjusting the ACK/NACK payload size to X or less (e.g., X=20) without any repetition operations can be performed.

Figure 15:
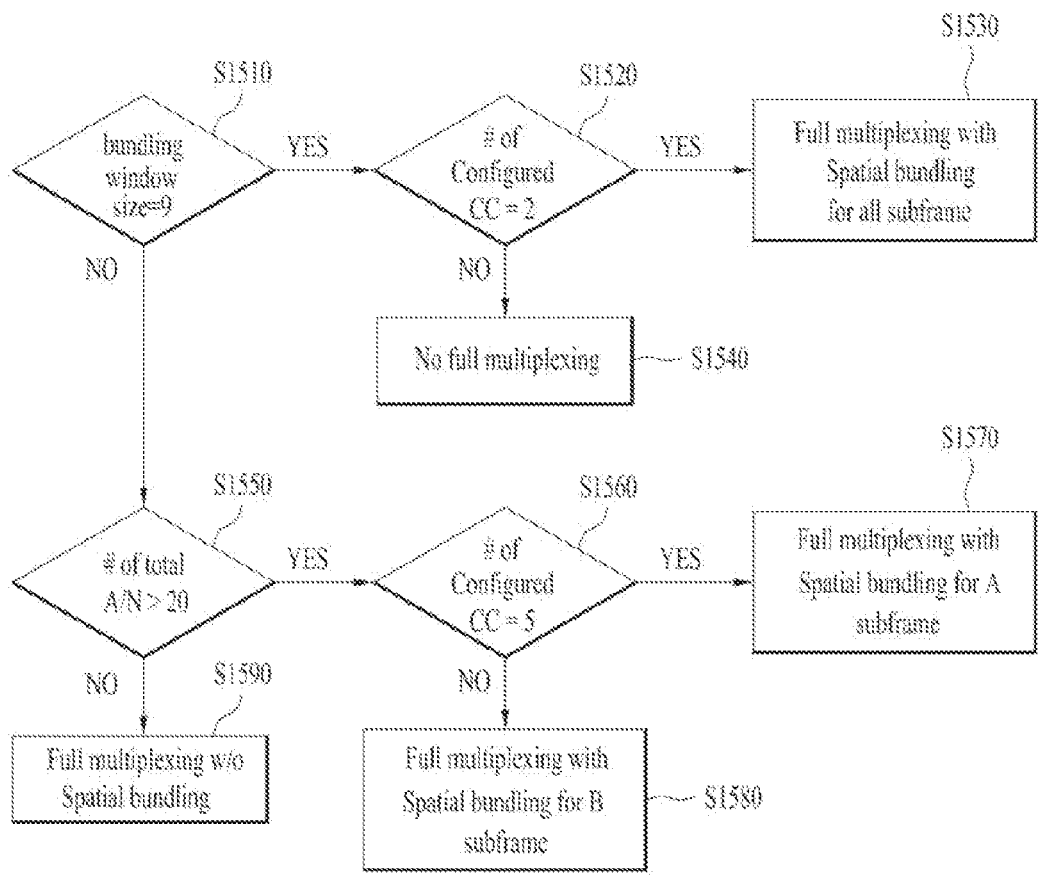
FIG. 15 shows another example of subframe level spatial multiplexing.

FIG. 15 shows another example for determining the application or non-application of the spatial bundling of a subframe level.

As can be seen from FIG. 15, in the case where a channel structure (or PUCCH format) for supporting the ACK/NACK payload size of X (for example, X=20) in a TDD system, information as to the application or non-application of the ACK/NACK full multiplexing and information as to which one of subframes is to be spatially bundled can be determined.

In step S1510, it is determined whether the bundling window size is set to 9. The bundling window size of 9 means that ACK/NACK transmission for 9 DL subframes is established in one UL subframe (i.e., 9 DL:1 UL). Only in the case where the bundling window size is set to 9 and the number of UE-configured CCs is set to 2 at step S1520, the spatial bundling can be applied to all CCs (i.e., all subframes and all carriers, each of which has 2 CWs) of all subframes contained in the bundling window at step S1530. On the other hand, in the case where the bundling window size is set to 9 and the number of UE-configured CCs is set to 3 or higher, the full multiplexing is not applied irrespective of the application or non-application at step S1540, because the ACK/NACK channel structure exceeds X bits although the spatial bundling is applied.

In the case where the bundling window size is set to 9 or others (this means that the bundling window size of the LTE system is set to 2, 3 or 4), it is determined whether the sum of individual ACK/NACK bits exceeds X bits (where X=20) at step S1550. If the sum of individual ACK/NACK bits does not exceed X bits at step S1550, the ACK/NACK full multiplexing can be applied without the execution of spatial bundling at step S1590. On the other hand, if the sum of individual ACK/NACK bits exceeds X bits at step S1550, it is determined whether the number of UE-configured CCs is set to 5 at step S1560.

If the number of UE-configured CCs is set to 5 at step S1560, the spatial bundling can be applied to A subframes at step S1570. For example, A may be denoted by $2 \cdot N_{bundling\_windos} + \lfloor (N_{total\_CWs} - 4)/4 \rfloor + \lfloor (N_{bundling\_windos} + 3)/N_{total\_CWs} \rfloor - 5$. The principles for deriving the above-mentioned rule have already been disclosed in Embodiments 2-1 to 2-4. Predetermined numbers of subframes can be sequentially selected in ascending (or descending) numerical order of subframe indexes, and the spatial bundling is performed in the selected CCs.

If the number of UE-configured CCs is not set to 5 at step S1560 (i.e., if the number of UE-configured CCs is set to 2, 3, or 4), the spatial bundling can be applied to B subframes at step S1580. For example, B may be denoted by $2 \cdot N_{bundling\_windows} + \lfloor (N_{total\_CWs} + 1)/2 \rfloor - 9$. The principles for deriving the above-mentioned rule have already been disclosed in Embodiments 2-1 to 2-4. Predetermined numbers of subframes can be sequentially selected in ascending (or descending) numerical order of subframe indexes, and the spatial bundling is performed in the selected CCs.

In this way, the spatial bundling is applied to one or more subframes on the basis of the ACK/NACK full multiplexing, such that a maximum number (X) of bits supported by the ACK/NACK channel structure can be maximally used, an original state of individual ACK/NACK information is maximally maintained, the spatial bundling is applied to a subframe level, and ACK/NACK information can be efficiently transmitted.

The above-mentioned embodiments 1 and 2 can be summarized as follows.

In the case where a specific ACK/NACK channel structure (or PUCCH format) is used to apply the ACK/NACK full multiplexing to a TDD system, and in the case where the payload size supportable by the corresponding ACK/NACK channel structure is predefined as X, the spatial bundling can be applied on a CC basis (Embodiment 1) or can also be applied on a subframe basis (Embodiment 2) under the condition that the a total number of individual ACK/NACK bits to be transmitted in a specific UL subframe exceeds X bits.

If the spatial bundling is applied to all CCs and all subframes, a DL throughput may be deteriorated. In more detail, the reason why X bits are supported in the ACK/NACK channel structure is to transmit much more ACK/NACK feedback information, such that it is preferable that X bits are used at maximum. Therefore, the spatial bundling is applied only to some CCs or some subframes within the limits of possible, and it is preferable that the size of bits obtained by the execution of partial spatial bundling is very close to X or less. In accordance with the present invention, it is assumed that the same TDD UL/DL setting is applied to all UE-configured CCs.

The carrier level spatial bundling means that the spatial bundling is applied over all subframes contained in a specific carrier (i.e., all subframes contained in the bundling window). The carrier level spatial bundling according to the present invention can be represented by the following equation 17.

[Equation 17]

If the TDD UL/DL configuration for A/N feedback is 9DL:1UL
{
    If ($N_{configured\_CCs} = 2$)
    {
        Spatial bundling is applied for all CCs and all subframes.
    }
    Else
    {
        Mode1 is not supported.
    }
}
Else
{
    If ($N_{TotalAN} > 20$)
    {
        Spatial bundling is applied for
        ($N_{configuredDLsubframe} + N_{CW\_SF} - 9$)
        CC(s) which is configured by two CWs starting from the last logical indexed CCs.
    }
    Else {
        Full multiplexing without spatial bundling is used.
    }
}

In Equation 16, $N_{configuredDLsubframe}$ is the number of DL subframes established in one downlink CC (i.e., the number of DL subframes corresponding to a specific UL subframe in a TDD system), $N_{configured\_CCs}$ is the number of CCs established in one DL subframe, $N_{CW\_SF}$ is the number of CWs present in all downlink CCs contained in one DL subframe, and $N_{TotalAN}$ is a total number of individual ACK/NACK bits obtained prior to the execution of spatial bundling. In Equation 16, Mode 1 indicates an ACK/NACK transmission mode to which the ACK/NACK full multiplexing and spatial bundling are applied using an ACK/NACK channel structure capable of supporting a maximum payload size of X. In addition, the concept and description of FIG. 13 can be equally applied to Equation 16.

Next, the subframe level spatial bundling means that the spatial bundling is applied over all CCs contained in a specific subframe. The subframe level spatial bundling according to the present invention can be represented by Equation 18.

[Equation 18]

If the configuration for A/N feedback is 9DL:1UL
{
    If ($N_{configured\_CCs} = 2$)
    {
        Spatial bundling is applied for all CCs and all subframes.
    }

-continued

[Equation 18]

```
        Else
        {
            Mode1 is not supported.
        }
    }
    Else
    {
        If(N_{TotalAN} > 20)
        {
            If (N_{configured CCs} = 5)
            {
                Spatial bundling is applied for
                2 · N_{configuredDLsubframe} + ⌊(N_{CW_SF} − 4) / 4⌋ +
                ⌊(N_{configuredDLsubframe} + 3) / N_{CW_SF}⌋ − 5 subframes
                starting from the first (or last) subframe index.
            }
            Else (i.e., N_{configured CCs} = 1, 2, 3, or 4)
            {
                Spatial bundling is applied for
                2 · N_{configuredDLsubframe} + ⌊(N_{CW_SF} + 1) / 2⌋ − 9
                subframes starting from the first (or last) subframe index.
            }
        }
        Else
        {
            Full multiplexing without spatial bundling is used.
        }
    }
}
```

In Equation 17, $N_{configuredDLsubframe}$, $N_{configured\ CCs}$, $N_{CW\_SF}$, $N_{TotalAN}$, and Mode 1 are conceptually identical to those of Equation 16. In addition, the concept and description of FIG. 15 can be equally applied to Equation 17.

The size of ACK/NACK payload actually transmitted by the application of the above-mentioned carrier-level or subframe-level spatial bundling can be summarized as shown in the following Table 14. Payload sizes shown in Table 14 may correspond to 'Full multiplexing with spatial bundling' disclosed in Tables 6 to 13.

TABLE 14

| No. of configured CCs | CC-wise spatial bundling | Subframe-wise spatial bundling |
|---|---|---|
| 2 | 18 (for 9DL: 1UL) | 18 (for 9DL: 1UL) |
| 3 | 20 | 18 |
| 4 | 20, 18, 20, 18, or 20 | 20, 18, 19, 20, or 20 |
| 5 | 20, 18, 20, 18, 20, 18, 20, 18, or 20 | 20, 19, 20, 18, 20, 19, 20, 20, or 20 |

As can be seen from Table 14, it is possible to transmit ACK/NACK information composed of X bits or less (where X=20) in all cases other than a specific case in which 'Size of bundling window=9 (i.e. 9 DL:1 UL)' and the number of configured CCs is set to 3 or higher.

Figure 16:
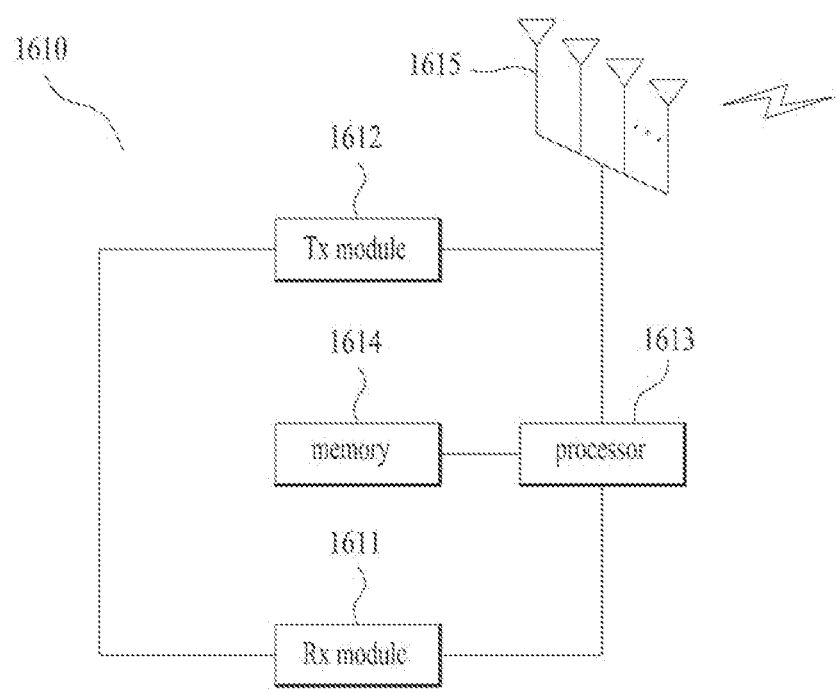
FIG. 16 is a block diagram illustrating an ACK/NACK transmitting apparatus according to the present invention.

FIG. 16 is a block diagram illustrating an ACK/NACK transmitting apparatus according to the present invention.

Referring to FIG. 16, the transmitting apparatus 1610 according to the present invention may include a reception (Rx) module 1611, a transmission (Tx) module 1612, a processor 1613, a memory 1614, and a plurality of antennas 1615. The plurality of antennas 1615 may support MIMO transmission and reception. The reception (Rx) module 1611 may receive a variety of signals, data and information in downlink starting from a base station. The transmission (Tx) module 1612 may transmit a variety of signals, data and information in uplink for the base station. The processor 1613 may provide overall control to the apparatus 1610.

The apparatus 1610 according to one embodiment of the present invention may be configured in the form of a UE apparatus for transmitting ACK/NACK information in a multicarrier-supporting wireless communication system. The processor 1613 of the UE apparatus may be designed to generate individual ACK/NACK information for each codeword (CW) that is received from the Rx module 1611 through N carriers (N CCs, N≥2) in M DL subframes (where M≥2) starting from the base station. In addition, in the case where a total of numbers of bits of individual ACK/NACK information exceeds a predetermined payload size and M is not set to 9, the processor 1613 may perform the spatial bundling for individual ACK/NACK information of (M+C−9) CCs M DL subframes covering M DL subframes (where, C is the sum of maximum numbers of CWs configured for N CCs in one DL subframe). In addition, the processor 1613 may transmit the spatially-bundled ACK/NACK information and the remaining ACK/NACK information to the base station through the Tx module in one UL subframe.

On the other hand, the UE apparatus may also be designed to perform the ACK/NACK spatial bundling at a subframe level.

The processor 1613 of the apparatus 1610 shown in FIG. 16 may arithmetically perform processing of information received in the apparatus 1610, information to be transmitted externally, and the like. The memory 1614 may store the processed information for a predetermined time. The memory 1614 may be replaced with a component such as a buffer (not shown)

In association with the above-mentioned apparatus 1610 shown in FIG. 16, the contents described in the above-mentioned embodiments may be used independently of each other or two or more embodiments may be simultaneously applied, and the same parts may herein be omitted for convenience and clarity of description.

The base station shown in FIG. 16 may also be applied to a relay node (RN) acting as a DL transmission entity or UL reception entity, and the UE shown in FIG. 16 may also be applied to a relay node (RN) acting as a DL reception entity or UL transmission entity.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

As apparent from the above description, exemplary embodiments of the present invention have the following effects. The embodiments of the present invention provide a method and apparatus for effectively reporting feedback information in a MIMO system. The embodiments of the present invention are applicable to a variety of mobile communication systems (for example, OFDMA, SC-FDMA, CDMA, and TDMA communication systems based on multiple access technology).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for allowing a user equipment to transmit ACK/NACK information in a multicarrier-supporting wireless communication system, the method comprising:
   generating individual ACK/NACK information in association with individual codewords received from a base station through N carriers (where N≥2) in M downlink subframes (where M≥2), wherein a number of bits of the individual ACK/NACK information in association with the individual codewords received through the N carriers in the M downlink subframes exceeds a predetermined number of bits;
   performing spatial bundling to individual ACK/NACK information in association with individual codewords received through M+C−9 carriers among the N carriers and in the M downlink subframes; and
   transmitting the spatially-bundled ACK/NACK information and the remaining individual ACK/NACK information without applying the spatial bundling, to the base station through one uplink subframe,
   wherein C is a total sum of maximum numbers of codewords configured in each of the N carriers in one downlink subframe.

2. The method according to claim 1, wherein the spatial bundling is applied over individual ACK/NACK information of several codewords in one downlink subframe and one carrier.

3. The method according to claim 1, wherein the (M+C−9) carriers are sequentially selected from a last logical indexed carrier from among a plurality of carriers, each of which transmits 2 codewords, from among the N carriers.

4. The method according to claim 1, wherein a total sum of numbers of bits of the spatially-bundled ACK/NACK information and numbers of bits of the remaining individual ACK/NACK information is identical to or less than the predetermined number of bits.

5. The method according to claim 1, wherein the wireless communication system is a time division duplex (TDD) system.

6. The method according to claim 1, wherein:
   M is set to 2, 3, 4 or 9,
   N is set to 2, 3, 4 or 5,
   one or two codewords are transmitted in each of the N carriers, and
   the predetermined number of bits is 20 bits.

7. A user equipment for transmitting ACK/NACK information in a multicarrier-supporting wireless communication system, the user equipment comprising:
   a receiver for receiving a downlink signal from a base station;
   a transmitter for transmitting an uplink signal to the base station; and
   a processor connected to the reception module and the transmission module so as to control operations of the user equipment,
   wherein the processor is configured to:
   generate individual ACK/NACK information in association with individual codewords received from the base station through N carriers (where N≥2) in M downlink subframes (where M≥2), wherein a number of bits of the individual ACK/NACK information in association with the individual codewords received through the N carriers in the M downlink subframes exceeds a predetermined number of bits;
   perform spatial bundling to individual ACK/NACK information in association with individual codewords received through M+C−9 carriers among the N carriers and in the M downlink subframes; and
   transmit the spatially-bundled ACK/NACK information and the remaining individual ACK/NACK information without applying the spatial bundling, to the base station through one uplink subframe,
   wherein C is a total sum of maximum numbers of codewords configured in each of the N carriers in one downlink subframe.

8. The user equipment according to claim 7, wherein the spatial bundling is applied over individual ACK/NACK information of several codewords in one downlink subframe and one carrier.

9. The user equipment according to claim 7, wherein the (M+C−9) carriers are sequentially selected from a last logical indexed carrier from among a plurality of carriers, each of which transmits 2 codewords, from among the N carriers.

10. The user equipment according to claim 7, wherein a total sum of numbers of bits of the spatially-bundled ACK/NACK information and numbers of bits of the remaining individual ACK/NACK information is identical to or less than the predetermined number of bits.

11. The user equipment according to claim 7, wherein the wireless communication system is a time division duplex (TDD) system.

12. The user equipment according to claim 7, wherein:
   M is set to 2, 3, 4 or 9,
   N is set to 2, 3, 4 or 5,
   one or two codewords are transmitted in each of the N carriers, and
   the predetermined number of bits is 20 bits.

* * * * *